US010576817B2

(12) United States Patent
Battaglini et al.

(10) Patent No.: US 10,576,817 B2
(45) Date of Patent: Mar. 3, 2020

(54) THREE-WHEELED VEHICLE

(71) Applicant: Polaris Industries Inc., Medina, MN (US)

(72) Inventors: Giancarlo Battaglini, Chisago City, MN (US); Bret H. RempelEwert, Shafer, MN (US); Scott T. Mazour, Lindstrom, MN (US); Kristopher K. Biegler, Minneapolis, MN (US); Rickie A. Evenson, Ham Lake, MN (US)

(73) Assignee: Polaris Industries Inc., Medina, MN (US)

( * ) Notice: Subject to any disclaimer, the term of this patent is extended or adjusted under 35 U.S.C. 154(b) by 185 days.

(21) Appl. No.: 15/595,628

(22) Filed: May 15, 2017

(65) Prior Publication Data
US 2018/0327038 A1  Nov. 15, 2018

(51) Int. Cl.
B62K 5/027 (2013.01)
B60K 11/04 (2006.01)
B60G 3/20 (2006.01)
B60G 21/055 (2006.01)
B60K 11/08 (2006.01)
B62D 23/00 (2006.01)
(Continued)

(52) U.S. Cl.
CPC .............. B60K 11/04 (2013.01); B60G 3/20 (2013.01); B60G 21/055 (2013.01); B60K 11/08 (2013.01); B62D 23/005 (2013.01); B62D 61/065 (2013.01); B60G 2200/144 (2013.01); B60G 2200/44 (2013.01); B60G 2300/122 (2013.01); B60K 11/02 (2013.01); B60Y 2200/122 (2013.01)

(58) Field of Classification Search
CPC ...... B62D 61/08; B62D 61/125; B62D 24/04; B60K 11/04; B60K 11/02; B60G 3/20; B60G 21/055; B60G 2300/122; B60G 2200/144; B60G 2200/44
USPC ....................................... 180/210
See application file for complete search history.

(56) References Cited

U.S. PATENT DOCUMENTS 3,859,968 A   1/1975  Stinebaugh
4,157,013 A   6/1979  Bell, II
4,708,107 A   11/1987 Stinebaugh
(Continued)

FOREIGN PATENT DOCUMENTS

AU  2013205955  2/2016
CA     974830   9/1975
(Continued)

OTHER PUBLICATIONS

Office Action issued by the Canadian Intellectual Property Office, dated Mar. 25, 2019, for Canadian Patent Application No. 3,005,018; 5 pages.
(Continued)

Primary Examiner — Toan C To
(74) Attorney, Agent, or Firm — Faegre Baker Daniels LLP

(57) ABSTRACT

A vehicle includes a plurality of ground-engaging members, a frame assembly supported by the ground-engaging members, and a powertrain assembly supported by the frame. The powertrain assembly includes at least an engine. The vehicle further includes a cooling assembly fluidly coupled to at least the engine and which includes a radiator and at least one fan positioned rearward of the radiator and angled relative to the radiator.

25 Claims, 24 Drawing Sheets

(51) Int. Cl.
*B62D 61/06* (2006.01)
*B60K 11/02* (2006.01)

(56) References Cited

U.S. PATENT DOCUMENTS

| | | | |
|---|---|---|---|
| 5,332,368 | A | 7/1994 | Macier |
| 5,957,105 | A | 9/1999 | Tsunoda |
| 6,058,917 | A | 5/2000 | Knowles |
| 6,161,529 | A | 12/2000 | Burgess |
| 6,202,621 | B1 | 3/2001 | Inumaru |
| 6,412,451 | B2 | 7/2002 | Kuga |
| 6,435,264 | B1* | 8/2002 | Konno .............. B60K 11/04 123/41.49 |
| 6,884,022 | B2 | 4/2005 | Albright |
| 6,955,141 | B2 | 10/2005 | Santanam |
| 7,194,985 | B2 | 3/2007 | Wachigai |
| 7,578,277 | B2 | 8/2009 | Inui |
| 8,118,001 | B2 | 2/2012 | Kowada |
| 8,225,751 | B2 | 7/2012 | Kisaichi |
| 8,347,865 | B2 | 1/2013 | Valencia |
| 8,522,744 | B2 | 9/2013 | Takiguchi |
| 8,807,114 | B2 | 8/2014 | Itakura |
| 8,813,692 | B2 | 8/2014 | Bialas |
| 8,893,690 | B2 | 11/2014 | Efta |
| 8,925,500 | B2 | 1/2015 | Kisaichi |
| 9,080,497 | B2 | 7/2015 | Yamashiro |
| 9,140,153 | B2 | 9/2015 | Valencia |
| 9,163,552 | B2 | 10/2015 | Iida |
| 9,266,421 | B2 | 2/2016 | Sugiura |
| 9,938,881 | B2 | 4/2018 | Yamada |
| 2003/0070661 | A1 | 4/2003 | Yasui |
| 2004/0206314 | A1 | 10/2004 | Gunji |
| 2005/0257972 | A1* | 11/2005 | Iwami .............. B62K 5/01 180/68.1 |
| 2006/0278451 | A1* | 12/2006 | Takahashi .............. B60K 11/04 180/68.1 |
| 2007/0227473 | A1 | 10/2007 | Tsubouchi |
| 2008/0257317 | A1 | 10/2008 | Cerabone |
| 2010/0187033 | A1* | 7/2010 | Hayashi .............. B60K 11/04 180/68.4 |
| 2011/0079187 | A1 | 4/2011 | Steiner |
| 2011/0114286 | A1* | 5/2011 | Komatsu .............. B60K 11/04 165/51 |
| 2011/0304176 | A1* | 12/2011 | Kihara .............. B60K 11/04 296/193.09 |
| 2013/0256044 | A1 | 10/2013 | Sugiura |
| 2014/0124279 | A1* | 5/2014 | Schlangen .............. B60G 3/20 180/68.4 |
| 2015/0122205 | A1 | 5/2015 | Tada |
| 2016/0138530 | A1 | 5/2016 | Lee |
| 2016/0221636 | A1* | 8/2016 | Laroche .............. B62K 5/027 |
| 2017/0166043 | A1* | 6/2017 | Yun .............. B60K 11/04 |
| 2017/0233022 | A1* | 8/2017 | Marko .............. B60K 11/04 180/210 |
| 2017/0284275 | A1* | 10/2017 | Nam .............. B60H 1/3211 |
| 2018/0065464 | A1* | 3/2018 | Palhegyi .............. B60G 7/02 |
| 2018/0328258 | A1 | 11/2018 | Nugteren |
| 2018/0328259 | A1 | 11/2018 | Bluhm |
| 2019/0070952 | A1 | 3/2019 | Battaglini |

FOREIGN PATENT DOCUMENTS

| | | |
|---|---|---|
| CA | 2374765 | 11/2007 |
| CA | 2295464 | 9/2008 |
| CA | 2599820 | 6/2010 |
| CA | 2634400 | 10/2010 |
| CA | 3005018 | 11/2018 |
| CN | 101943048 | 1/2011 |
| CN | 1755075 | 9/2011 |
| CN | 101852119 | 6/2013 |
| CN | 204060930 | 12/2014 |
| CN | 102691561 | 5/2015 |
| CN | 103122791 | 5/2015 |
| CN | 104632347 | 5/2015 |
| DE | 10047081 | 5/2002 |
| DE | 102014219252 | 4/2016 |
| DE | 102014220816 | 4/2016 |
| EP | 473931 | 11/1993 |
| EP | 707141 | 9/1999 |
| EP | 1298288 | 2/2004 |
| EP | 1185768 | 6/2007 |
| EP | 2071150 | 12/2009 |
| EP | 2644861 | 1/2014 |
| FR | 2783278 | 3/2000 |
| FR | 2800125 | 4/2001 |
| JP | 3756502 | 3/2006 |
| JP | 3907903 | 4/2007 |
| JP | 4145506 | 9/2008 |
| JP | 2008291803 | 12/2008 |
| JP | 2009144596 | 7/2009 |
| JP | 4444056 | 3/2010 |
| JP | 4729535 | 7/2011 |
| JP | 4812636 | 11/2011 |
| JP | 4858718 | 1/2012 |
| JP | 4875573 | 2/2012 |
| JP | 5290029 | 9/2013 |
| JP | 5315066 | 10/2013 |
| JP | 2013204524 | 10/2013 |
| JP | 5342306 | 11/2013 |
| JP | 2014025438 | 2/2014 |
| JP | 2015086767 | 5/2015 |
| JP | 2015090143 | 5/2015 |
| JP | 5841025 | 1/2016 |
| WO | WO 2015/146832 | 10/2015 |
| WO | WO 2018/213216 | 11/2018 |

OTHER PUBLICATIONS

International Search Report issued by the International Searching Authority, dated Oct. 11,2018, for International Patent Application No. PCT/US2018/032628; 6 pages.
Written Opinion of the International Searching Authority, dated Oct. 11, 2018, for International Patent Application No. PCT/US2018/032628; 11 pages.

* cited by examiner

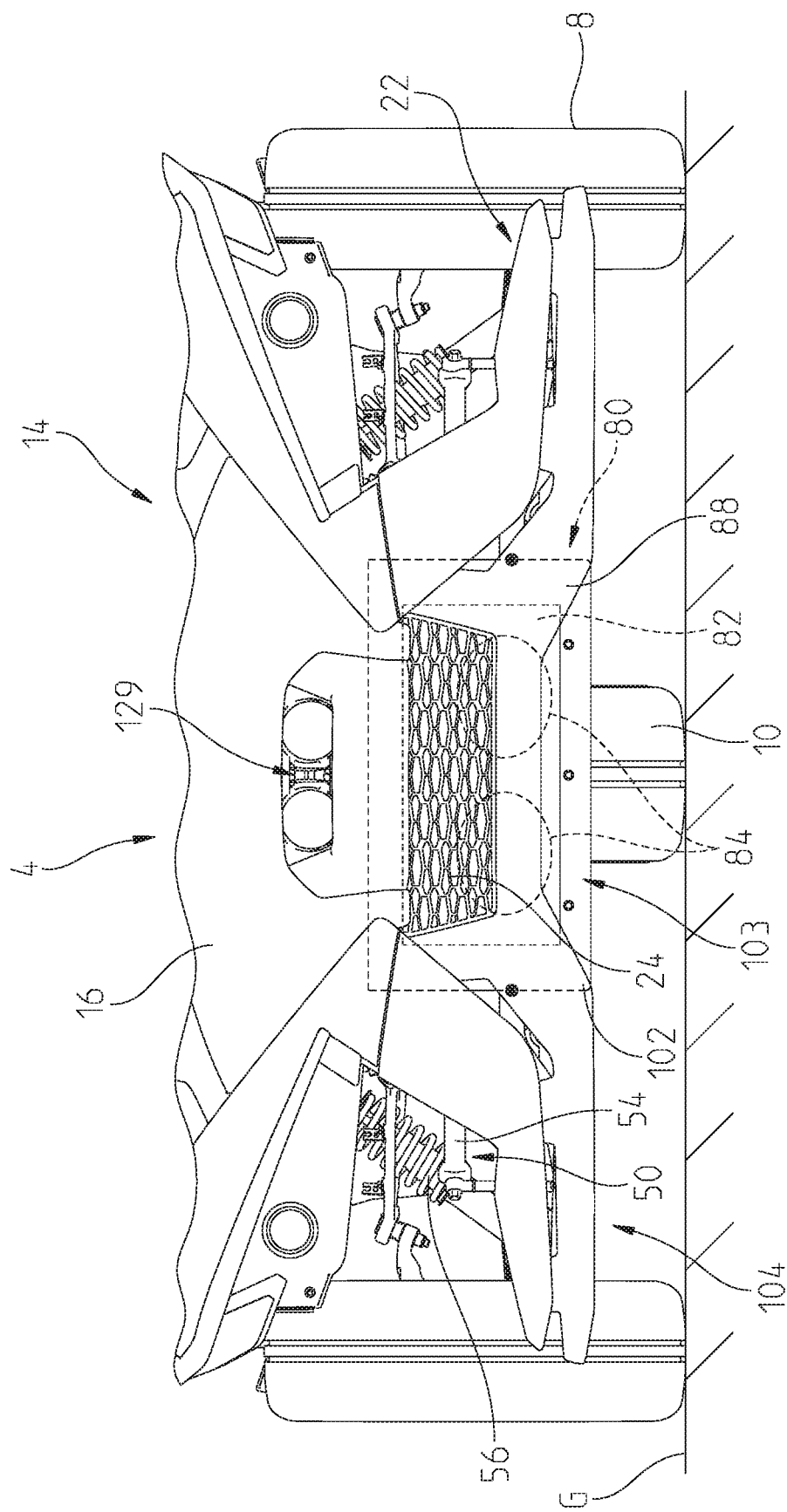

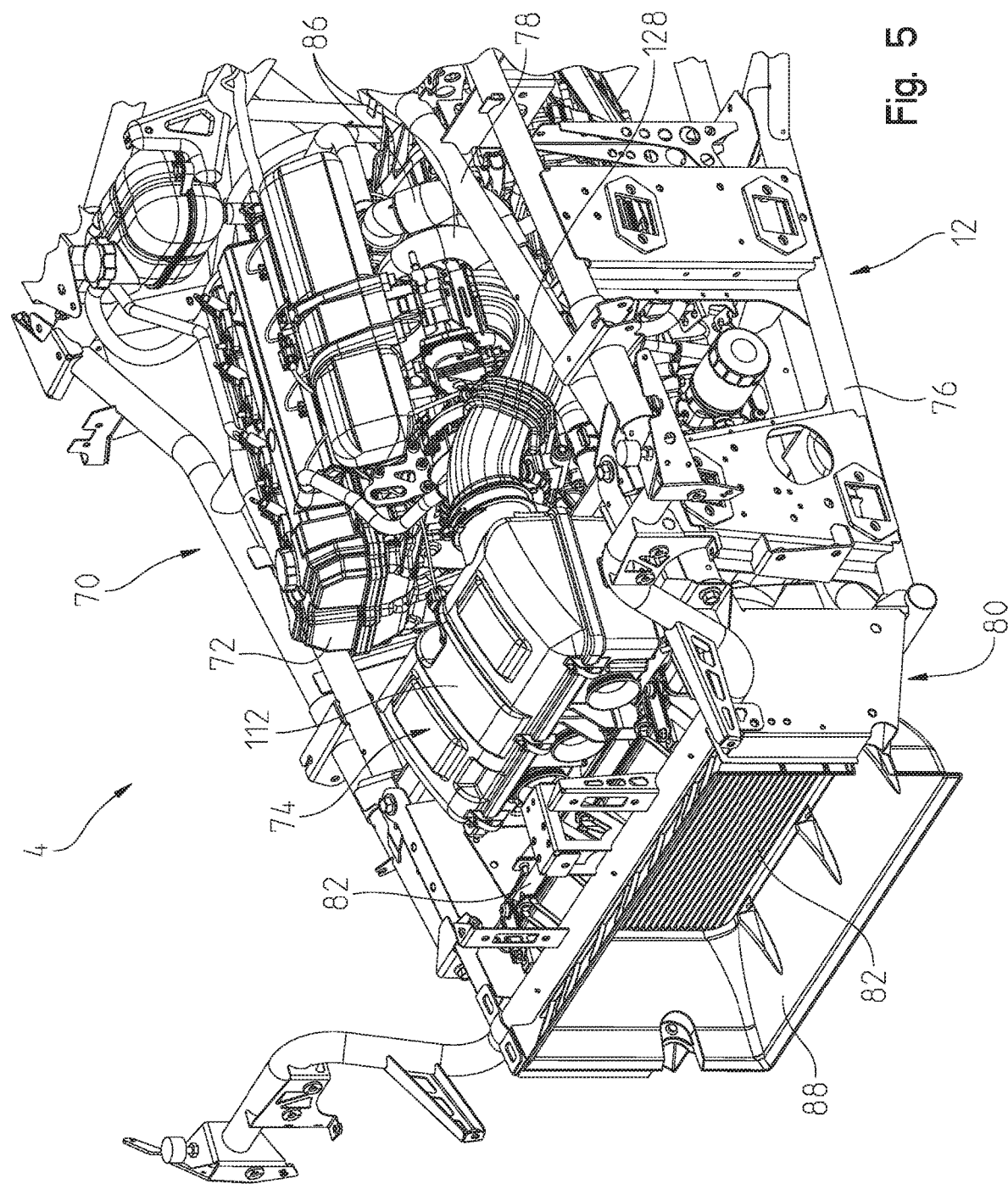

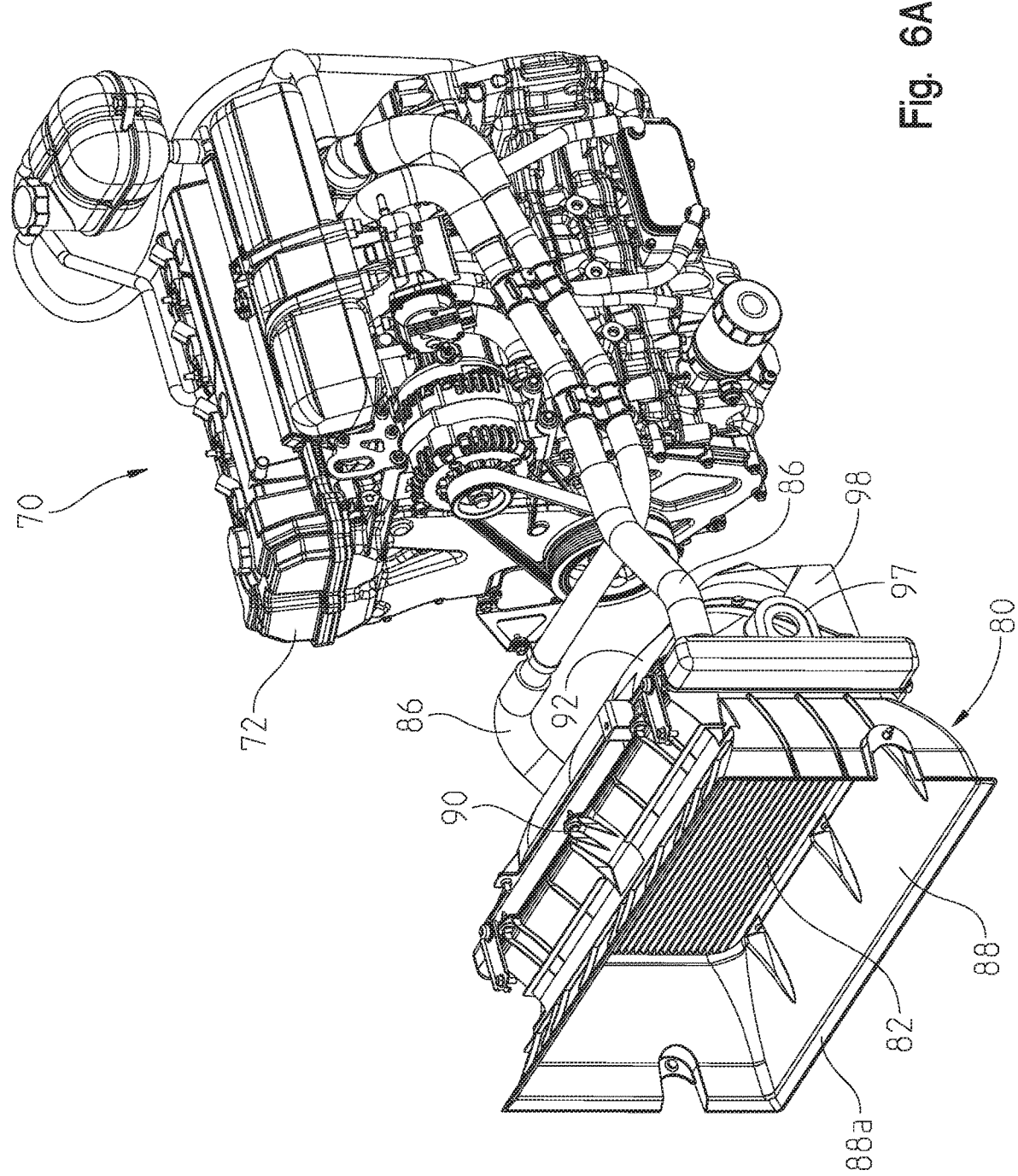

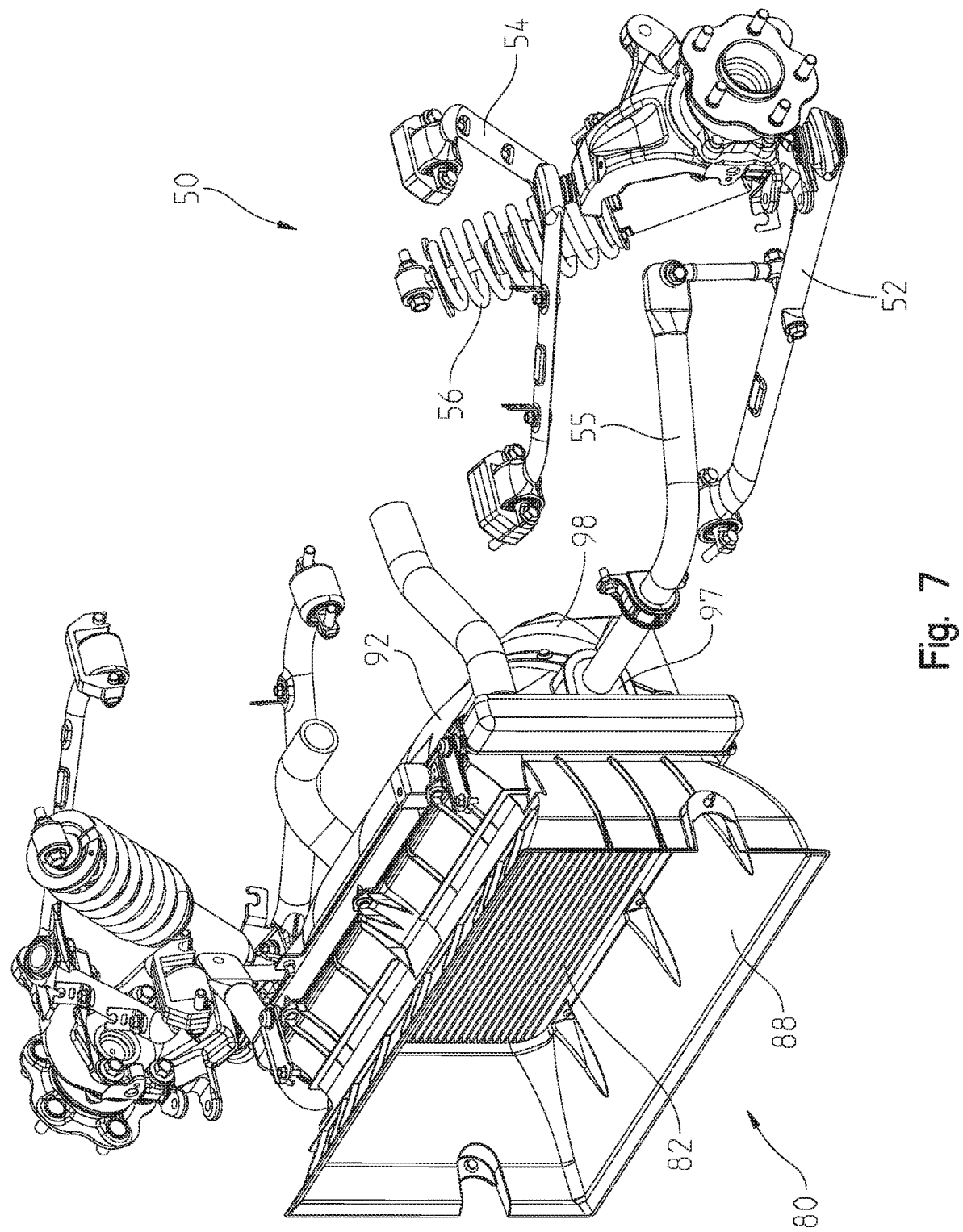

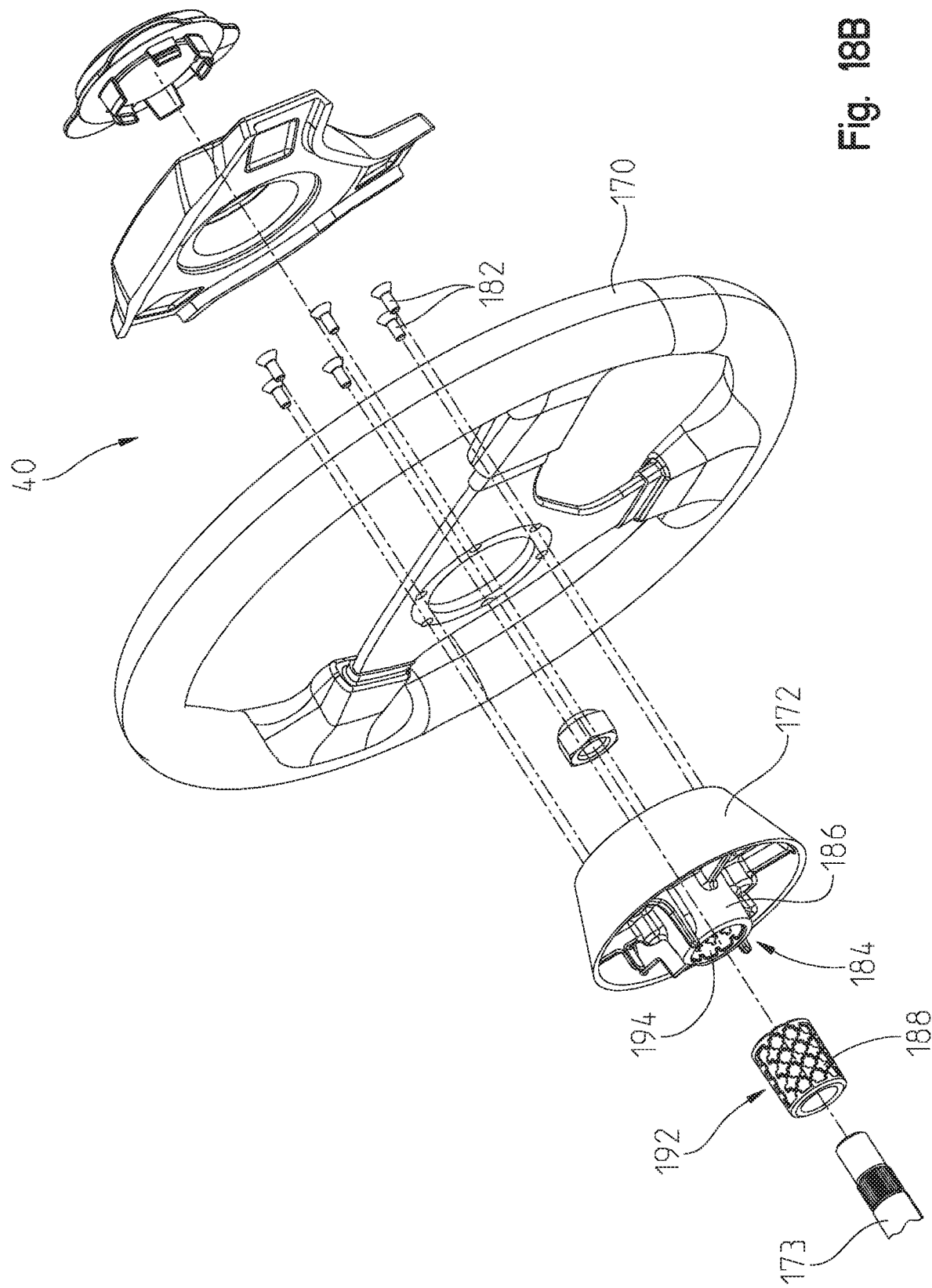

THREE-WHEELED VEHICLE

BACKGROUND OF THE DISCLOSURE

The present disclosure generally relates to an on-road vehicle and, more particularly, to a three-wheeled vehicle configured with a cooling assembly supported at a front end thereof.

Various vehicles have an engine and other components of a powertrain assembly positioned at the front of the vehicle. However, also positioned at the front of the vehicle is the front suspension, the front wheels, various electrical components, and the cooling system. As such, it may be difficult to package and organize such large systems at the front of the vehicle without significantly increasing the size of the front end of the vehicle.

Additionally, and with respect to the cooling system, various components thereof, such as the radiator, must be arranged in a certain configuration in order to operate properly. For example, the radiator cannot be blocked by other components because the air flow to the radiator would be impeded. As such, the radiator must be positioned in such a way to receive the appropriate air flow for cooling the engine but also must be arranged with all other components at the front end of the vehicle.

Therefore, there is a need to configure various systems and components of a vehicle, especially at the front end thereof, in an efficient packaging arrangement that allows for proper operation of the systems without substantially increasing the size of the vehicle.

SUMMARY OF THE DISCLOSURE

In one embodiment of the present disclosure, a vehicle comprises a plurality of ground-engaging members, a frame assembly supported by the ground-engaging members, and a powertrain assembly supported by the frame. The powertrain assembly includes at least an engine. The vehicle further comprises a cooling assembly fluidly coupled to at least the engine and which includes a radiator and at least one fan positioned rearward of the radiator and angled relative to the radiator.

A further embodiment of the present disclosure includes a vehicle comprising a plurality of ground-engaging members configured to contact a ground surface. The ground-engaging members include at least one front ground-engaging member having an axis of rotation. The vehicle further comprises a frame supported by the ground-engaging members and the frame includes a front frame portion and a rear frame portion. Additionally, the vehicle comprises a body assembly comprising a plurality of body panels supported by the frame, a powertrain assembly operably coupled to the ground-engaging members, and a cooling assembly fluidly coupled to the powertrain assembly and positioned directly forward of the axis of rotation of the at least one front ground-engaging member and below an upper surface of the at least one front ground-engaging member.

Another illustrative embodiment of the present disclosure includes a vehicle comprising a plurality of ground-engaging members, a frame assembly supported by the ground-engaging members, a powertrain assembly supported by the frame which includes at least an engine, and a cooling assembly fluidly coupled to at least the engine and including a radiator, at least one fan positioned rearward of the radiator, and a shroud extending rearward of the radiator and forward of the at least one fan. A forward end of the shroud extends vertically and a rearward end of the shroud is angled relative to vertical such that the shroud is configured to direct air flowing through the radiator downwardly.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 4A is a front view of the front portion of the vehicle of FIG. 3, including the location of the cooling system;

FIG. 5 is a front left perspective view of a portion of a lower frame assembly supporting a powertrain assembly and the cooling assembly of the vehicle of FIG. 1;

FIG. 6A is a front left perspective view of the powertrain assembly and the cooling assembly of FIG. 5;

FIG. 7 is a front left perspective view of the cooling assembly of FIG. 5 and a front suspension assembly of the vehicle;

FIG. 18B is a further exploded view of the portion of the steering assembly of FIG. 17, including a steering wheel adapter;

DETAILED DESCRIPTION OF THE DRAWINGS

Figure 1:
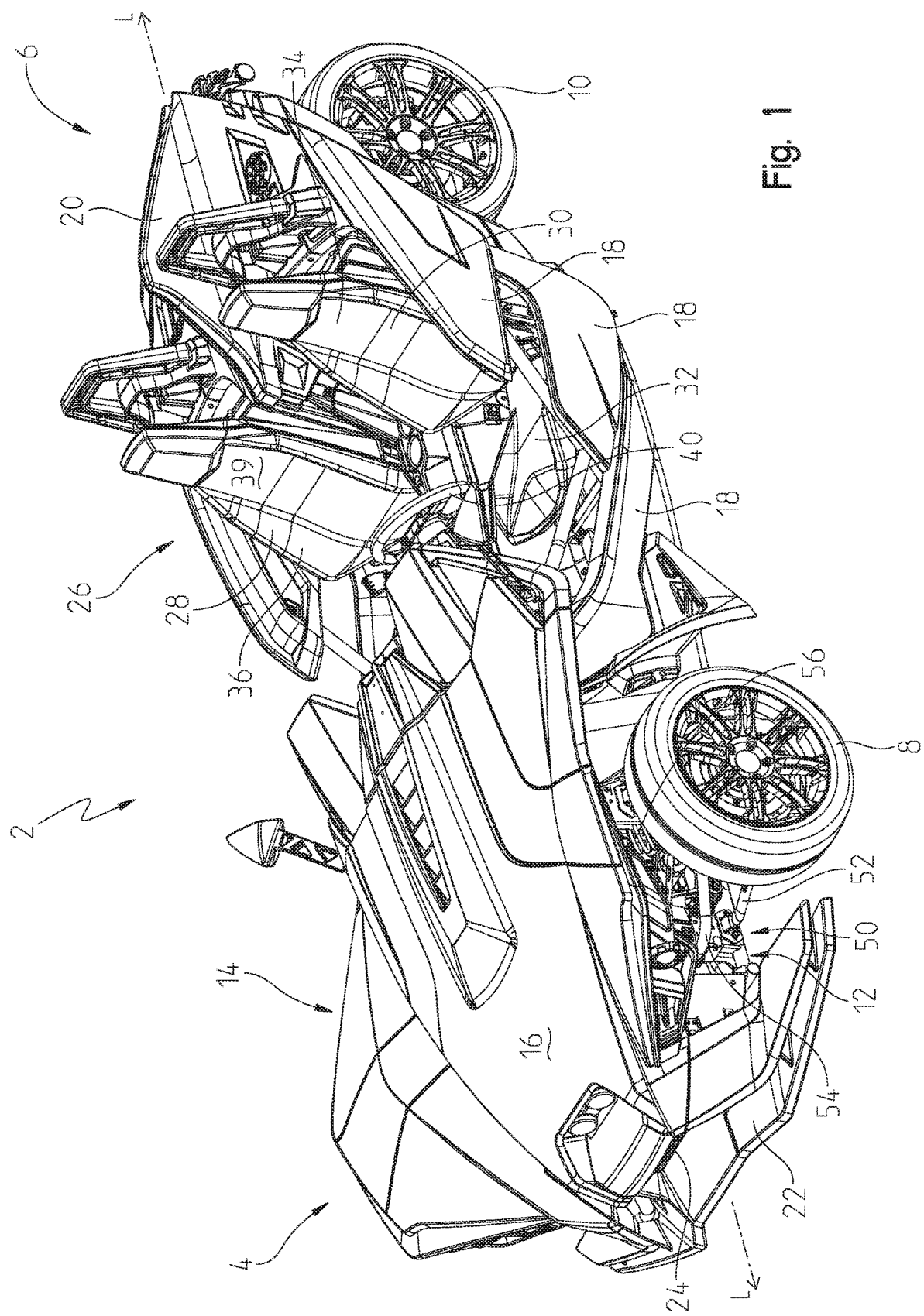
FIG. 1 is a front left perspective view of a three-wheeled vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a three-wheeled vehicle, it should be understood that the features disclosed herein may have application to other types of vehicles such as all-terrain vehicles, utility vehicles, motorcycles, watercraft, snowmobiles, people movers, and golf carts. Additionally, such features may be applicable to hybrid vehicles, electric vehicles, and any other type of vehicle.

Figure 2:
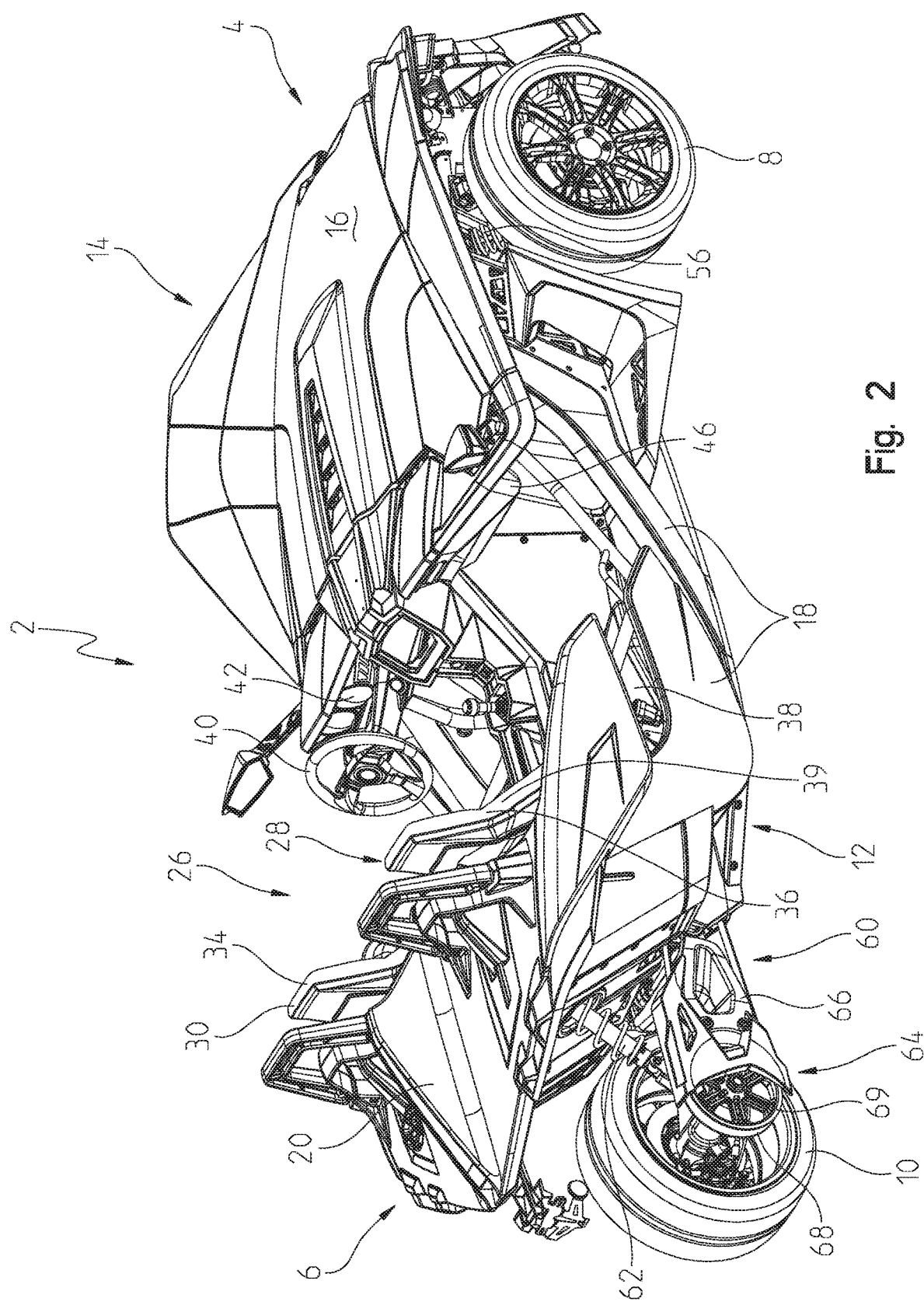
FIG. 2 is a rear right perspective view of the vehicle of FIG. 1.

With reference to FIGS. 1 and 2, a vehicle 2 is shown. Vehicle 2 includes a front end 4 and a rear end 6 positioned along a longitudinal axis L (FIG. 1). A plurality of ground engaging members, including front wheels 8 and a single rear wheel 10, support utility vehicle 2 on a ground surface G. Illustratively, vehicle 2 is a three-wheeled vehicle. In one embodiment, one or more of front wheels 8 and/or rear wheel 10 may be replaced with tracks, such as the Prospector II Tracks available from Polaris Industries, Inc., located at 2100 Highway 55 in Medina, Minn. 55340 or non-pneumatic tires, such as those shown in U.S. Pat. Nos. 8,176,957 and 8,104,524, the complete disclosures of which are expressly incorporated herein by reference. Additionally, vehicle 2 is illustratively shown as an on-road vehicle, however, various embodiments of vehicle 2 may be configured to traverse a variety of terrain and may be operated on various trails.

Referring still to FIGS. 1 and 2, vehicle 2 includes a frame assembly 12 supported by front and rear wheels 8, 10 and which is generally concealed by a body assembly 14. Body assembly 14 includes a plurality of body panels supported by frame assembly 12 which couple together to define a continuous outer body of vehicle 2. For example, body assembly 14 may include at least a hood 16, a plurality of side panels 18, a rear panel 20, a front fender 22, and a radiator grille 24.

Figure 3:
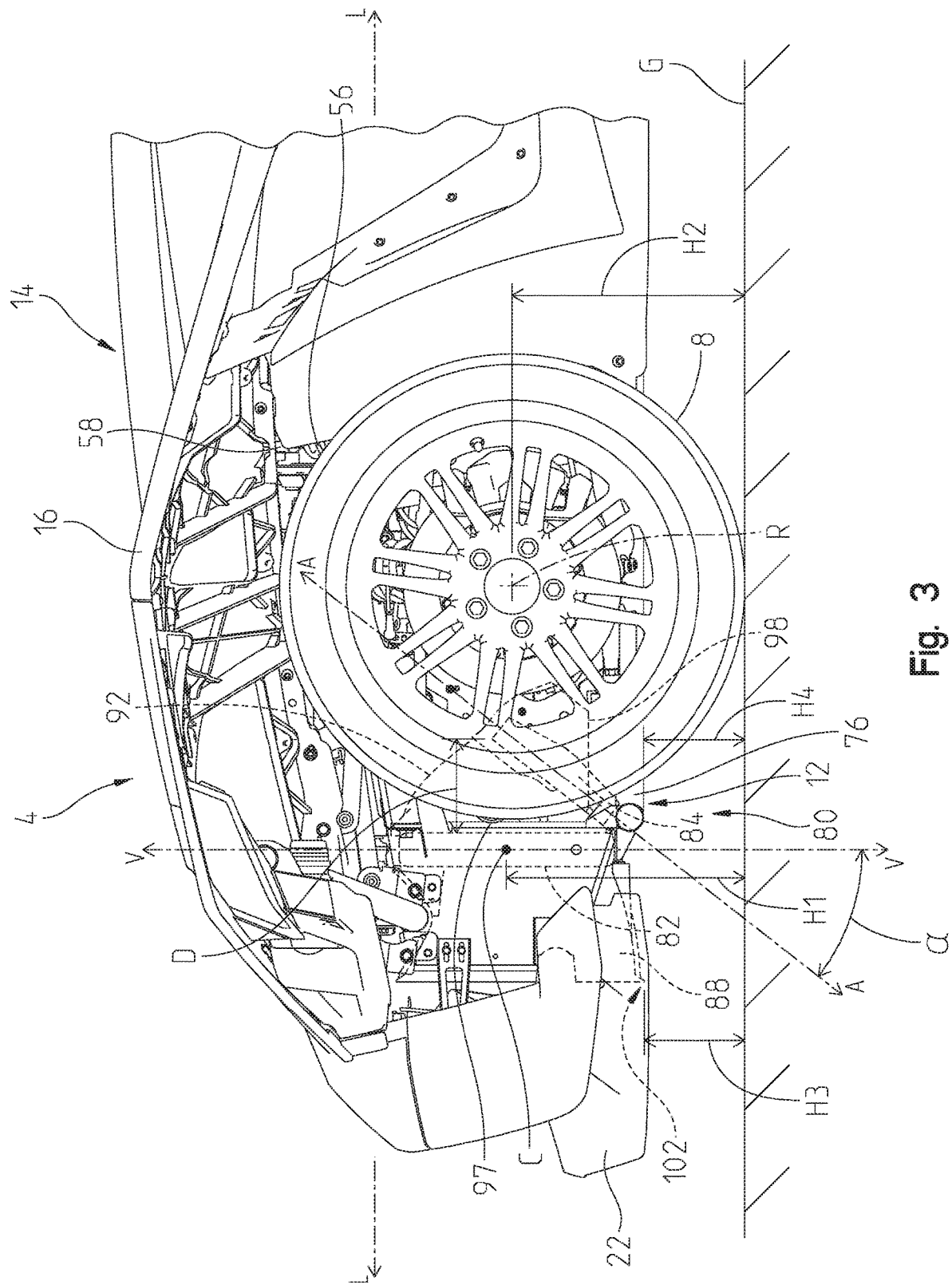
FIG. 3 is a left side view of a front portion of the vehicle of FIG. 1, illustrating a location of a cooling system of the vehicle.

Referring to FIGS. 1-4, front end 4 of vehicle 2 includes front wheels 8 which are operably coupled to a front suspension assembly 50. Front suspension assembly 50 includes at least a lower control arm 52 (FIG. 1), an upper control arm 54 (FIG. 4), a shock absorber 56 (FIG. 1) on both the right and left side of vehicle 2. Additionally, front suspension assembly 50 may include a stability bar 55 which is operably coupled to at least lower control arm 52. In one embodiment, stability bar 55 is configured as a sway bar for front suspension assembly 50. As shown in FIG. 3, shock absorber 56 may be coupled to frame assembly 12 at an upper end 58 thereof. Front suspension assembly 50 may be disclosed further in U.S. Pat. Nos. 9,004,214; 8,544,587; and 8,695,746, issued respectively on Apr. 14, 2015; Oct. 1, 2013; and Apr. 14, 2014, the complete disclosures of which are expressly incorporated by reference herein.

Additionally, and referring to FIG. 2, rear end 6 of vehicle 2 also includes a rear suspension assembly 60 including at least a shock absorber 62 and a drive assembly 64 having a rear trailing arm 66 and a belt 68 entrained about a drive sprocket (not shown) and a driven sprocket 69. Additional details of rear suspension assembly 60 may be disclosed in U.S. Pat. No. 9,469,374, issued on Oct. 18, 2016, the complete disclosure of which is expressly incorporated by reference herein.

As shown in FIGS. 1 and 2, frame assembly 12 also supports an operator area 26 of vehicle 2 positioned longitudinally intermediate front end 4 and rear end 6. Operator area 26 includes seating 28 for at least an operator of vehicle 2. Illustrative seating 28 includes an operator seat 30 having a seat bottom 32 and a seat back 34 and at least one passenger seat 36 having a seat bottom 38 and a seat back 39. Illustratively, seats 30, 36 are in a side-by-side seating arrangement, however, in various embodiments, passenger seat 36 may be positioned at least partially rearward of operator seat 30. As shown, operator area 26 is an open-air operator area 26, however, in other embodiments, vehicle 2 may include a cab assembly, including any or all of a front windshield, a rear windshield, full or half doors, and a roof, to partially or fully enclose operator area 26 above frame assembly 12.

Operator area 26 also includes operator inputs, such as steering assembly 40 and a shifter, at least one instrument display or gauge 42, and at least one storage compartment 46. In one embodiment, display 42 is disclosed further in U.S. patent application Ser. No. 15/161,720, filed May 23, 2016, the complete disclosure of which is expressly incorporated by reference herein.

Referring to FIGS. 1-10, front end 4 of utility vehicle 2 supports at least portions of a powertrain assembly 70 (FIG. 5), a cooling assembly 80 (FIG. 5), and an air intake assembly 74 (FIG. 5), as detailed further herein. As shown best in FIGS. 5-6B, powertrain assembly 70 includes an engine 72, additional details of which are filed in U.S. patent application Ser. Nos. 15/595,209 and 15/595,224, both filed May 15, 2017, the complete disclosures of which are expressly incorporated by reference herein. As shown in FIG. 5, at least powertrain assembly 70 is supported at front end 4 of vehicle 2 and is generally surrounded by and/or supported on at least a lower longitudinally-extending frame member 76 and an upper longitudinally-extending frame member 78 of frame assembly 12.

As shown in FIGS. 3-5, cooling assembly 80 also is supported at front end 4 of vehicle 2. Cooling assembly 80 includes a radiator 82, at least one fan 84 (illustratively two fans 84) positioned rearward of radiator 82, and a plurality of cooling lines or hoses 86 extending between radiator 82 and engine 72 for providing cooling fluid to engine 72. Cooling assembly 80 also includes a first shroud 88 positioned forward of radiator 82 for directing air flowing at front end 4 of vehicle 2 into radiator 82. Illustratively, first shroud 88 has a tapered configuration such that the outer surface or perimeter thereof narrows or decreases in size as first shroud 88 extends rearwardly to couple to with radiator 82. First shroud 88 is removably coupled to radiator 82 with fasteners 90 (FIG. 9), which, for example, are bolts and/or nuts.

First shroud 88 is configured to direct air from grille 24 (FIG. 4A) and under front fender 22 (FIG. 4A) into radiator 82. To increase air flow into radiator 82, a forward end 88a (FIG. 6) of first shroud 88 may be sealed to various components of body assembly 14 and/or frame assembly 12, thereby channeling or directing all air flow at grille 24 and near front fender 22 into radiator 82. In one embodiment, an inlet duct portion 103 for cooling assembly 80, illustratively defined by a lower portion of radiator 82 and first shroud 88, may extend below front fender 22 such that air is drawn into cooling assembly 80 from below front fender 22.

Figure 9:
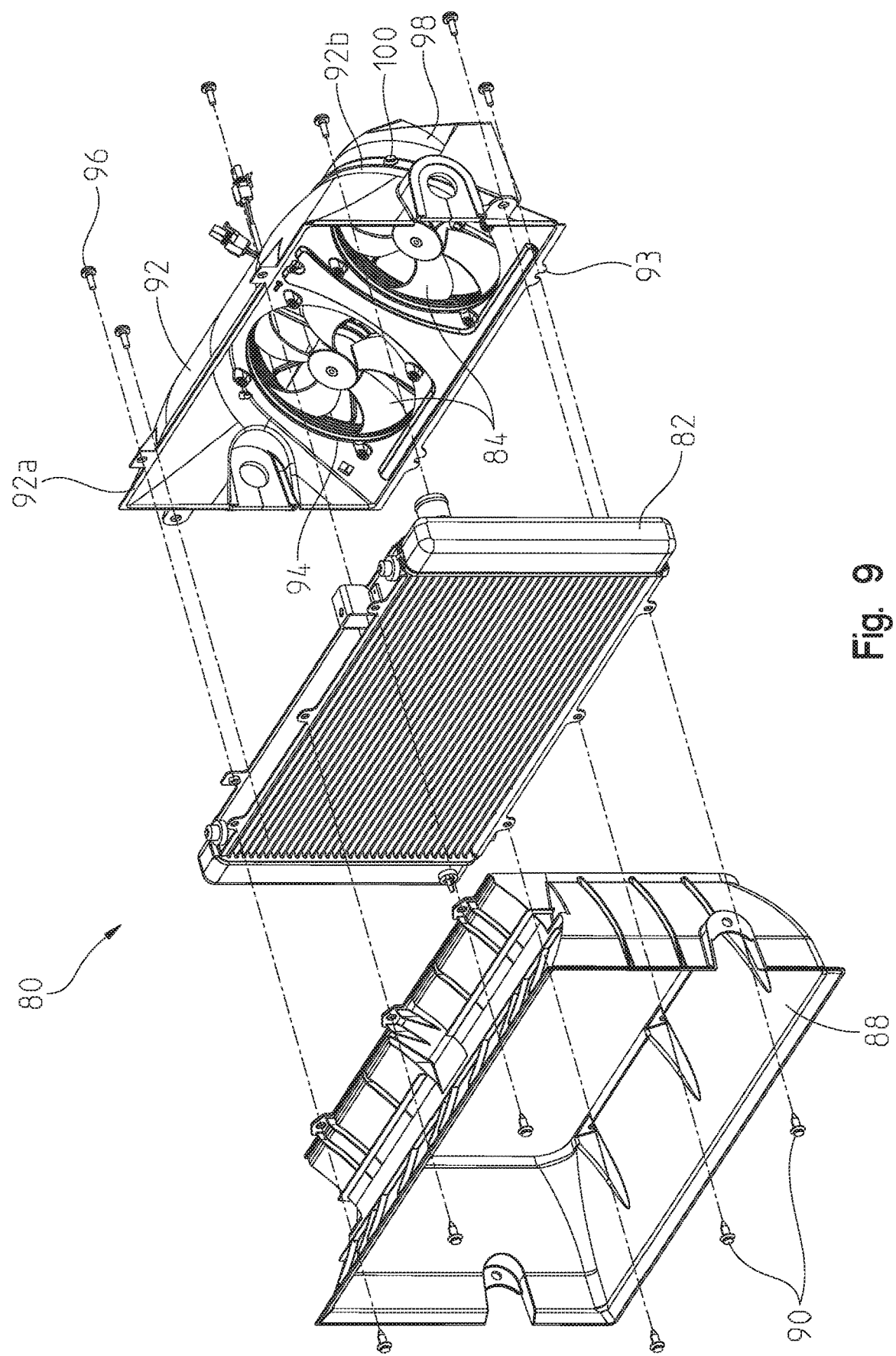
FIG. 9 is an exploded view of the radiator, radiator shroud, and plurality of fans of FIG. 8.

Referring to FIGS. 3-10, cooling assembly 80 also includes a second shroud 92 positioned rearward of radiator 82 and forward of fans 84. Illustratively, second shroud 92 has a curved configuration extending rearwardly from radiator 82 such that air flow through second shroud 92 is directed rearwardly and downwardly. More particularly, a forward end 92a of second shroud 92 extends vertically and a rearward end 92b of second shroud 92 is angled relative thereto (i.e., relative to vertical), thereby defining the curved shape of second shroud 92 extending therebetween (FIG. 9). Second shroud 92 also includes openings 94 for supporting fans 84 therein. As such, second shroud 92 generally houses fans 84 and fans 84 draw air through radiator 82. The air flowing from radiator 82 into second shroud 92 is directed downwardly towards fans 84, as is disclosed further herein. Second shroud 92 is removably coupled to radiator 82 with fasteners 96, which, for example, are bolts and/or nuts. Additionally, second shroud 92 includes a recessed flange 93 which is configured to couple with a mounting bracket or flange 95 on the rear surface of radiator 82 in order to couple together the lower end of both radiator 82 and second shroud 92 also with fasteners 96.

As shown in FIGS. 6A-9, second shroud 92 may include a retention member 97 configured to receive a portion of front suspension assembly 50 at a position directly rearward of radiator 82. More particularly, retention member 97 may be positioned longitudinal intermediate radiator 82 and fans 84. In one embodiment, retention member 97 may be configured to seal about a portion of stability bar 55 (FIG. 7) and also may be configured to accommodate any misalignment between various components. For example, stability bar 55 may traverse the width of vehicle 2 from the right side to the left side such that stability bar 55 extends through a portion of cooling assembly 80 forward of fans 84 and rearward of radiator 82. Illustratively, retention member 97 is configured to receive a seal or grommet 99, illustratively comprised of neoprene foam, for generally surrounding a portion of stability bar 55. In this way, stability bar 55 is configured to pivot or rotate within retention member 97 during operation of vehicle 2 but grommet 99 is configured to seal any opening between retention member 97 and stability bar 55. By configuring a portion of second shroud 92, illustratively retention member 97, to seal about a portion of front suspension assembly 50 which traverses the air flow path of cooling assembly 80, all of the air within cooling assembly 80 remains therein and is appropriately directed through cooling assembly 80, for example through first shroud 88, into radiator 82, through second shroud 92, and into fans 84 before being directed downwardly from vehicle 2. In this way, and especially when vehicle 2 is at idle, air leakages from cooling assembly 80 are minimized.

Referring still to FIGS. 3-10, cooling assembly 80 further includes a third shroud 98 positioned rearward of radiator 82 and fans 84. Like second shroud 92, illustrative third shroud 98 has a curved configuration such that air flow through third shroud 98 is directed downwardly. More particularly, the air flowing through radiator 82 and fans 84 exits vehicle 2 downwardly towards ground surface G (FIG. 3) due to the curved configuration of third shroud 98. In this way, the warm/hot air exiting cooling assembly 80 is directed away from operator area 26 to prevent warm/hot air from flowing towards the operator and/or passenger therein.

Figure 10:
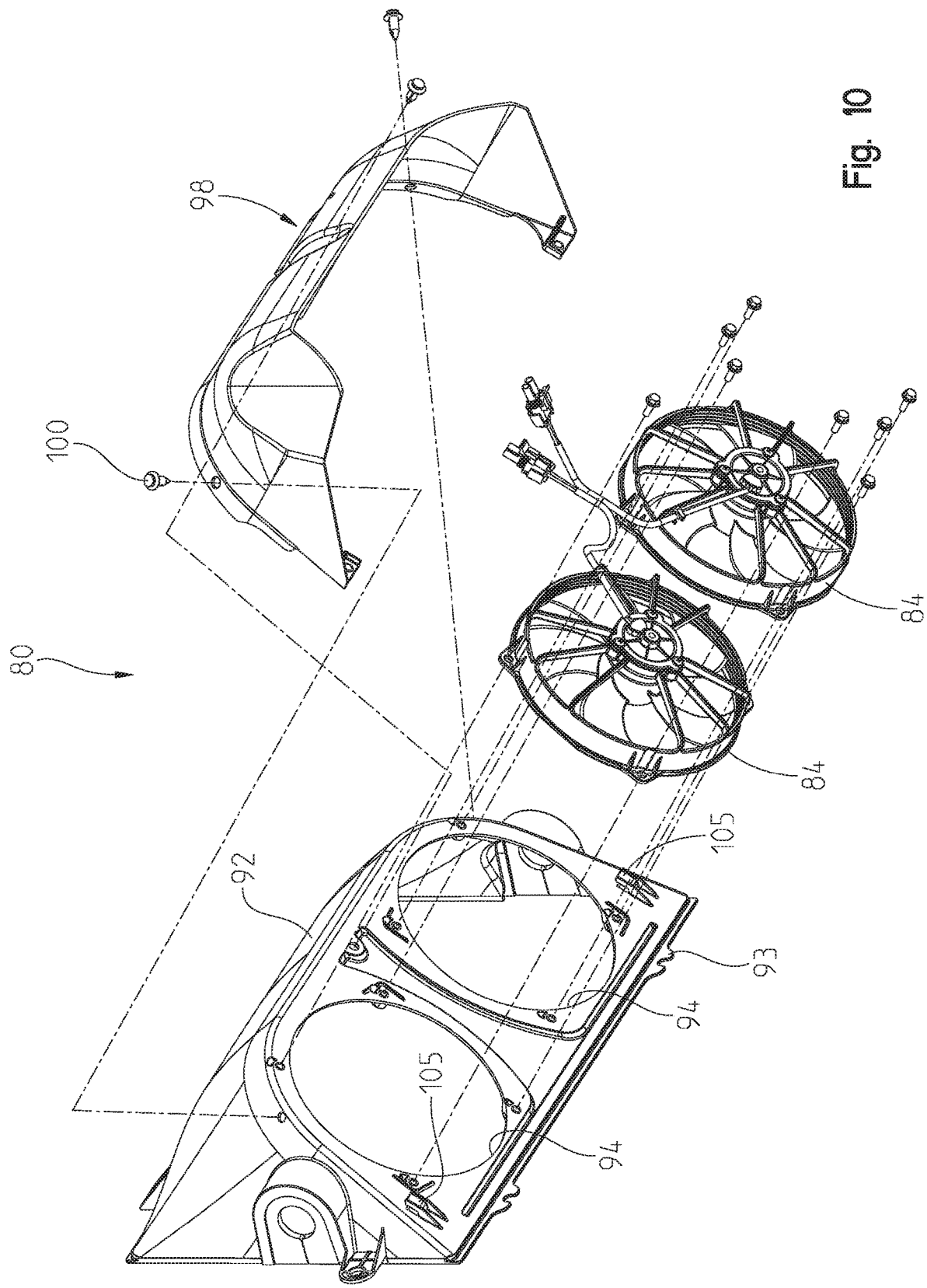
FIG. 10 is an exploded view of the fans and a shroud for the fans of FIG. 8.

In one embodiment, third shroud 98 is removably coupled to second shroud 92 with fasteners 100, such as nuts, bolts, etc. Additionally, third shroud 98 may be mounted to second shroud 92 with retention clips 105 positioned on a rear surface of second shroud 92 (FIG. 10). Retention clips 105 may allow for easy positioning of third shroud 98 relative to second shroud 92 and also may initially support third shroud 98 on second shroud 92 before fasteners 100 are coupled thereto.

As shown in FIGS. 3-10, fans 84 are angled relative to radiator 82 and, as such, are not positioned immediately rearward of radiator 82. Illustratively, radiator 82 extends in a vertical plane which includes vertical axis V (FIG. 3) and, instead, of positioning fans 84 parallel to radiator 82, illustrative fans 84 extend in an angled plane which includes angled axis A (FIG. 3). Angled axis A is angled relative to vertical axis V by an angle $\alpha$ which may be approximately 30-90° and, more particularly, may be approximately 30-60°, such as 36-40°. In one embodiment, angle $\alpha$ is 37°. In this way, fans 84 are spaced apart from radiator 82 by a distance D (FIG. 3) and are not immediately adjacent or rearward thereof. Rather, as shown in FIG. 9, fans 84 are supported at the rear surface of second shroud 92 such that the full extent of the curved surface of second shroud 92 spaces fans 84 from radiator 82. In one embodiment, distance D may be approximately 2.0-8.0 inches, and illustratively 5.2 inches, extending from the upper surface of fans 84 to the rear surface of radiator 82.

By positioning fans 84 at angle $\alpha$ relative to radiator 82, fans 84 are configured to draw air through radiator 82 and in a downward direction which decreases the likelihood that warm/hot air exiting cooling assembly 80 flows into operator area 26. Additionally, by spacing apart fans 84 relative to radiator 82 by distance D, the quantity and rate of air flowing through radiator 82 increases such that air flow through radiator 82 may be optimized. More particularly, because fans 84 are not immediately rearward and adjacent radiator 82, fans 84 draw air through the entire width and height of radiator 82, thereby utilizing the complete cooling surface of radiator 82. Conversely, when fans 84 are positioned immediately rearward of radiator 82 and in a parallel configuration therewith, fans 84 may only draw air through the portion of radiator 82 positioned directly forward of fans 84, thereby creating potential "dead spots" and decreasing the likelihood that air flows through any of the portions of radiator 82 outside of fans 84. For example, air may be drawn through radiator 82 only at a position corresponding to the diameter of fans 84, thereby decreasing the likelihood of air flow through the entirety of radiator 82. Therefore, by angling fans 84 relative to radiator 82 and by spacing fans 84 apart from radiator 82, as shown in FIGS. 3-10, fans 84 increase air flow through the entirety of radiator 82 and direct the warm/hot air flow from radiator 82 downwardly.

Referring to FIGS. 3 and 4A, air flow through radiator 82 also may be increased by the position of cooling assembly 80 on vehicle 2. Illustratively, cooling assembly 80 is supported at front end 4 of vehicle 2 forward of engine 72 and is positioned below hood 16 and at least partially rearward of front fender 22. In one embodiment, the position of cooling assembly 80 may allow for adjustment to the position of engine 72 and/or may allow for engine 72 to be made longer along longitudinal centerline L without interfering with cooling assembly 80. As shown in FIG. 3, cooling assembly 80 also is positioned directly forward of a portion of front wheel 8 and, more particularly, radiator 82 and first shroud 88 are both positioned completely forward of front wheel 8. As shown in FIG. 3, a center point C of radiator 82 is positioned at approximately the same height from ground surface G as axis of rotation R of front wheel 8 such that a height H1 between ground surface G to center point C of radiator 82 is approximately the same as a height H2 between ground surface G to axis of rotation R. Additionally, center point C of radiator 82 is at approximately the same height from ground surface G as retention member 97 (FIG. 3).

Additionally, cooling assembly 80 is positioned entirely below upper end 58 of shock absorber 56 of front suspension assembly 50. Cooling assembly 80 also is positioned entirely below the height of the upper surface of front wheel 8. More particularly, and as shown in FIG. 3, a majority of the height of fans 84 is positioned below axis of rotation R of front wheel 8. Illustratively, fans 84 each may include an upper end portion 106, a lower end portion 108, and an intermediate portion 110 extending therebetween, and at least intermediate portion 110 and lower end portion 108 of fans 84 are positioned below axis of rotation R. In one embodiment, upper end portion 106 may define the upper 10-20% of the height of fan 84, lower end portion 108 may define the lower 10-20% of the height of fan 84, and intermediate portion 110 defines the height therebetween. And, as shown best in FIG. 4A, fans 84 also are at least partially positioned below grille 24 such that at least lower end portion 108 of fans 84 and at least a portion of intermediate portion 110 are positioned below grille 24 for radiator 82.

Referring still to FIGS. 3 and 4A, a lower surface or extent 102 of cooling system 80 may be defined by the lowest-most surface thereof, illustratively the lowest-most surface of first shroud 88, and is at approximately the same height from ground surface G as lower longitudinally-extending frame member 76, which may define the lower extent of frame assembly 12. More particularly, a height H3 between ground surface G to lower extent 102 of cooling assembly 80 is approximately the same as a height H4 between ground surface G to the lower surface of lower longitudinally-extending frame member 76. Similarly, lower extent 102 of cooling assembly 80 also is generally flush with or at the same height from ground surface G as a lower extent 104 of body assembly 14 (FIG. 4A). In this way, cooling assembly 80 is at a forward and lowered position on vehicle 2. This forward and lowered position of cooling assembly 80 may increase air flow to cooling assembly 80 because fewer components on vehicle 2 block or inhibit air flow to radiator 82 such that air at front end 4 of vehicle 2 is drawn immediately into cooling assembly 80. Also, this forward and low position of cooling assembly 80 on vehicle 2 may create additional space on vehicle 2 for engine 72 and other components of powertrain assembly 70. Further, by lowering the position of cooling assembly 80 on vehicle 2, the center of gravity of at least radiator 82 and fans 84 is lowered, which may contribute to an overall lowered center of gravity of vehicle 2. Additionally, the lowered position of cooling assembly 80 ensures that the operator's line of sight and overall visibility is maintained. For example, cooling assembly 80 does not extend upwardly into hood 16 or create any vertical protrusion at front end 4 of vehicle 2 such that visibility over hood 16 is maintained.

Figure 4B:
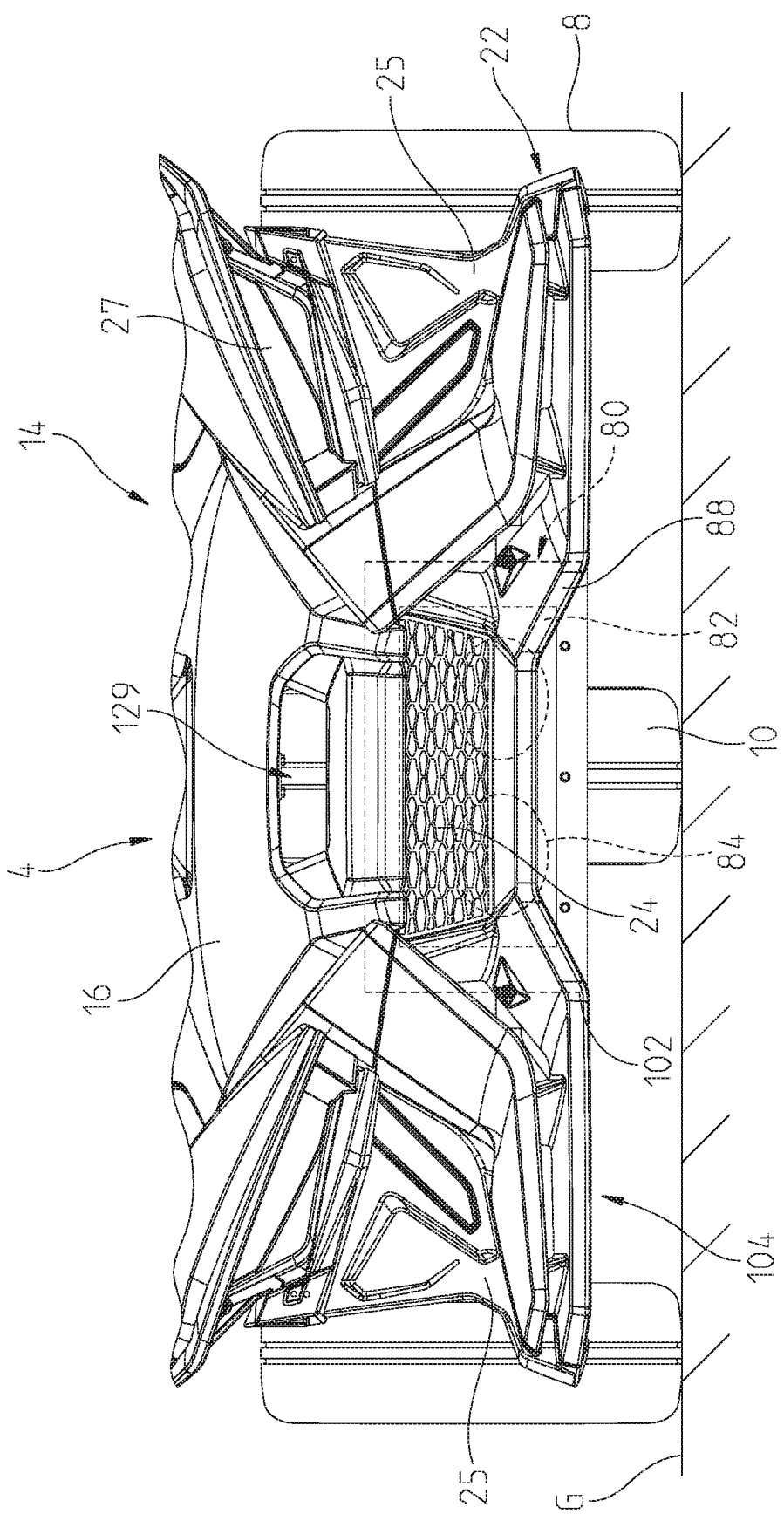
FIG. 4B is a front view of the front portion of the vehicle of FIG. 3, including close out body panels.
Figure 6B:
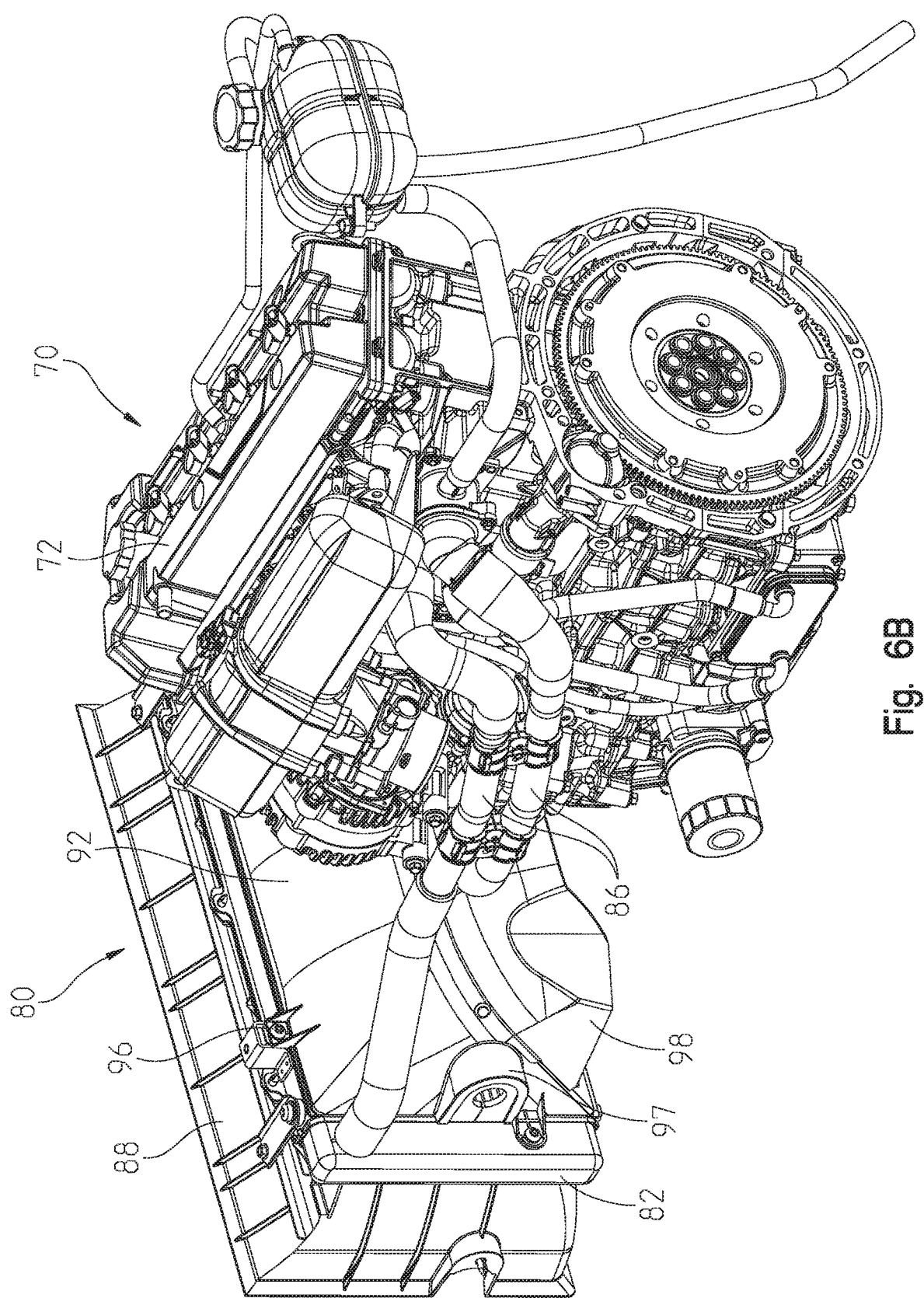
FIG. 6B is a rear left perspective view of the powertrain assembly and the cooling assembly of FIG. 6A.
Figure 8:
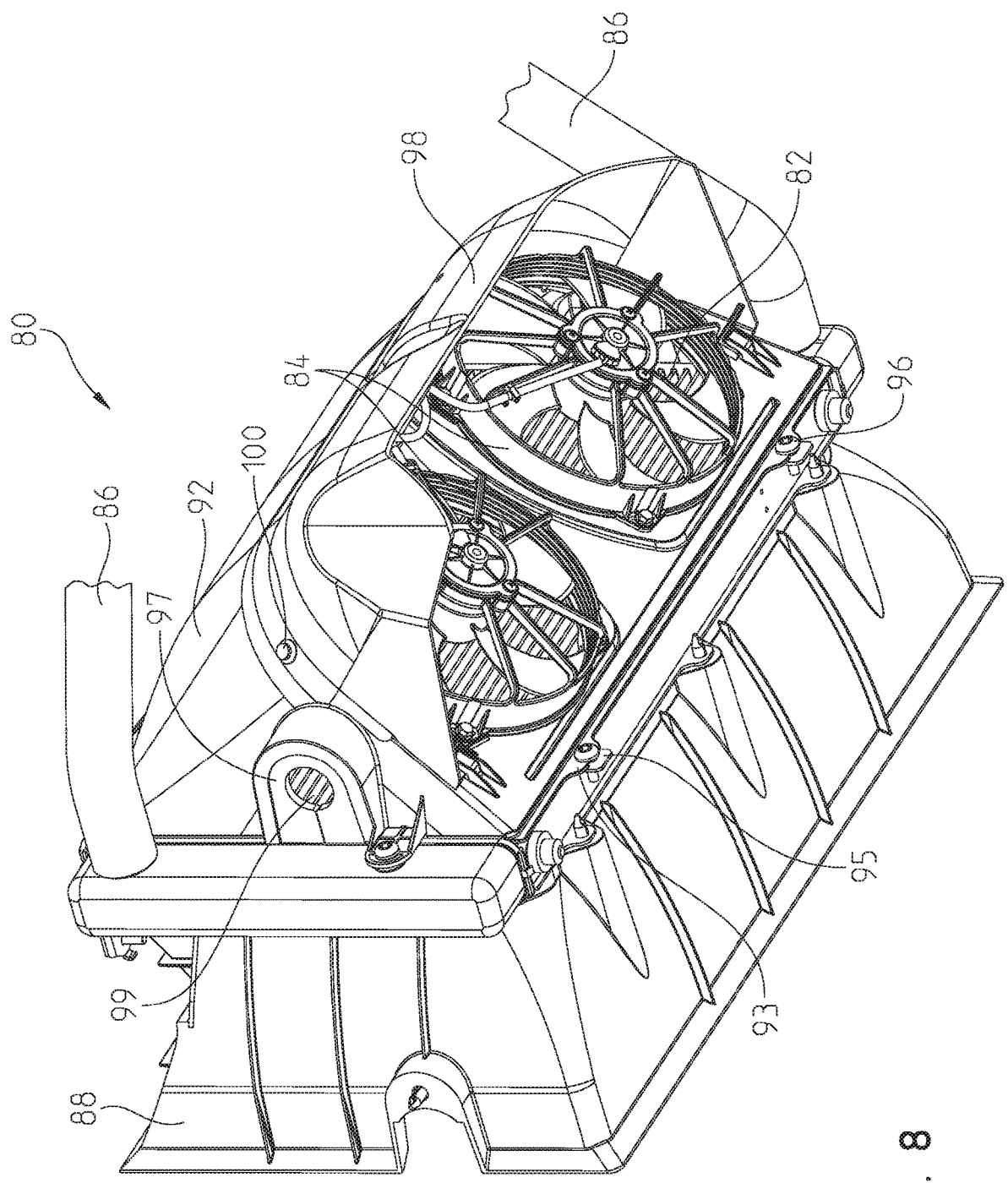
FIG. 8 is a lower rear left perspective view of a radiator, a radiator shroud, and a plurality of fans of the cooling assembly of FIG. 6B.

Referring to FIG. 4B, air flow through radiator 82 may be increased further by body assembly 14 which may include close out body panels 25. Body panels 25 of body assembly 14 are illustratively configured to conceal at least a portion of front suspension assembly 50 when viewed from the front of vehicle 2. For example, body panels 25 may be positioned adjacent radiator grille 24, below headlights 27, and positioned forward of at least a portion of front wheels 8, shock absorber 56 and control arms 52, 54. Also, body panels 25 may be configured to direct air towards cooling assembly 80 such that increased air quantities flow toward radiator 82. More particularly, body panels 25 facilitate the creation of a high-pressure zone or region at front end 4 of vehicle 2 which drives more air flow through radiator 82. In other words, because body panels 25 inhibit air at front end 4 of vehicle 2 from flowing along front wheels 8 and through portions of front suspension assembly 50, a high-pressure region forms at front end 4 which directs the air at front end 4 toward cooling assembly 80 to increase air flow into radiator 82.

Figure 11:
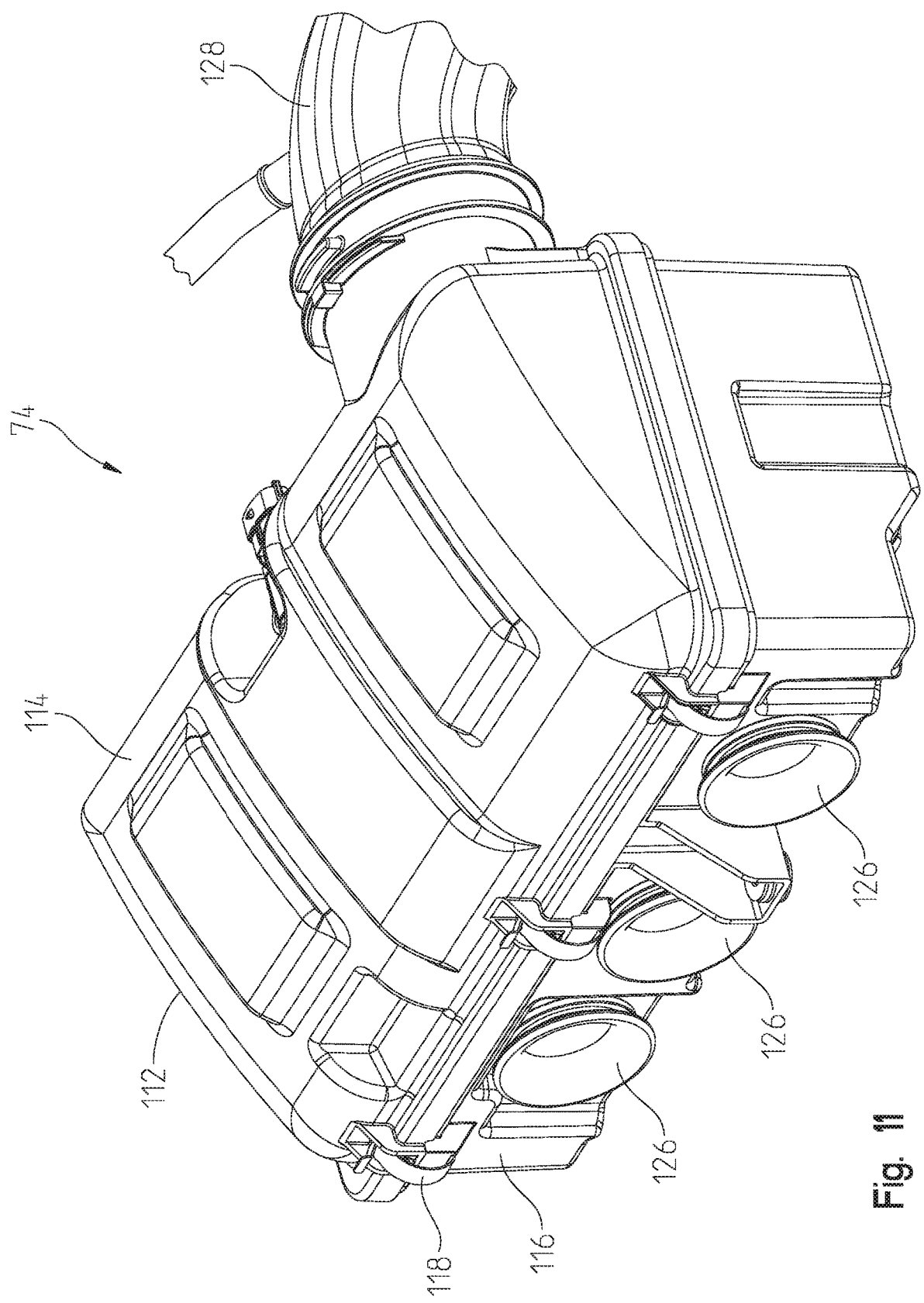
FIG. 11 is a front left perspective view of an air intake assembly for the powertrain assembly of FIG. 5.
Figure 12:
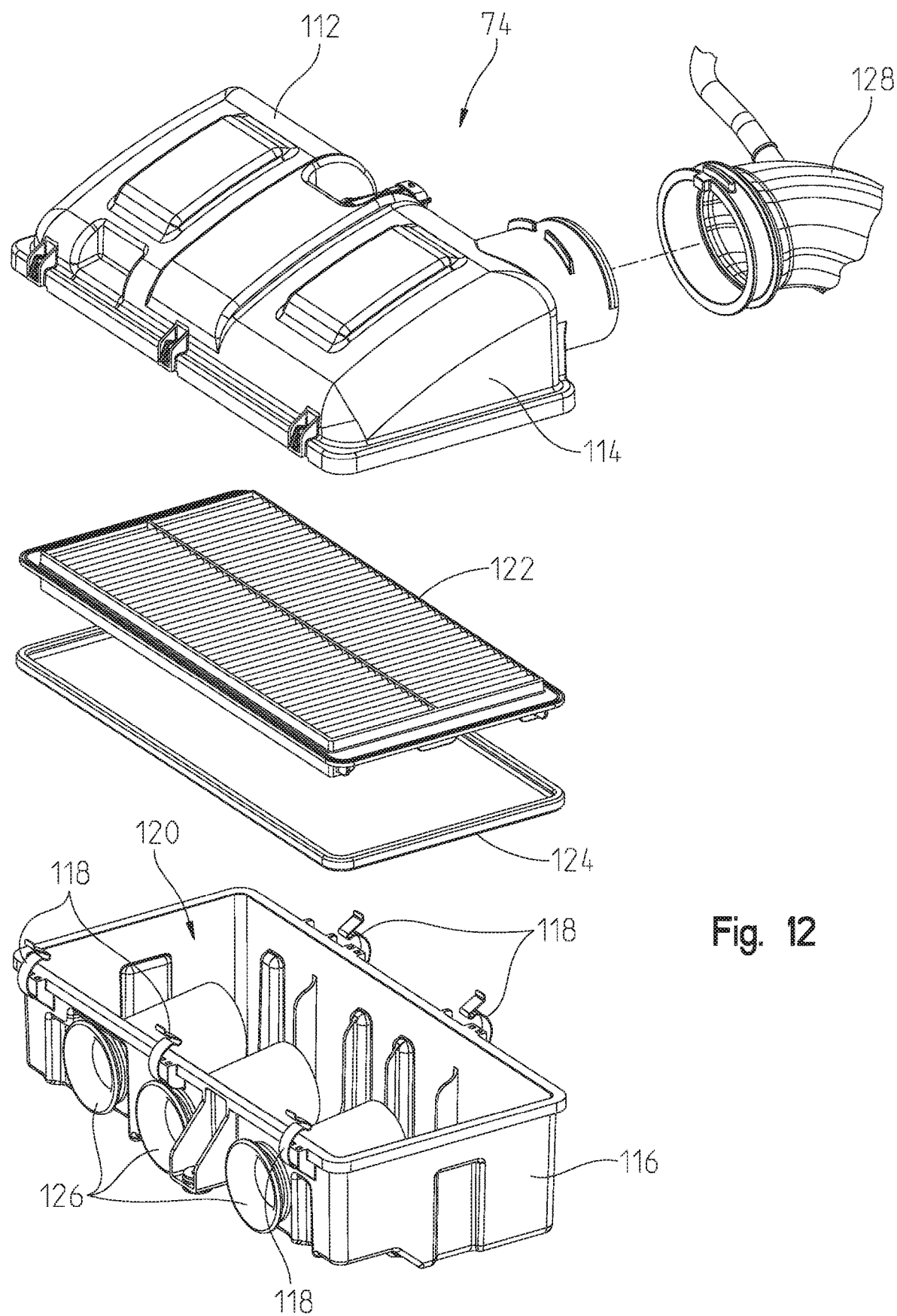
FIG. 12 is an exploded view of the air intake assembly of FIG. 11.

Referring to FIGS. 11 and 12, the lowered and forward position of cooling assembly 80 on vehicle 2 also may allow additional space for air intake assembly 74. Air intake assembly 74 is fluidly coupled to engine 72 to provide combustion air thereto. As shown in FIG. 5, air intake assembly 74 is positioned longitudinally intermediate cooling assembly 80 and engine 72. Air intake assembly 74 includes an airbox 112 defined by an upper housing portion 114 and a lower housing portion 116. Upper housing portion 114 may be removably coupled to lower housing portion 116 through latches 118 or other removable fasteners. When upper and lower housing portions 114, 116 are coupled together, an interior volume 120 is defined therebetween in which a filter 122 may be positioned. Filter 122 includes a seal 124 configured to contact upper and/or lower housing portions 114, 116 to ensure that air flowing into interior volume 120 flows through filter 122 and does not bypass filter 122.

In operation, air flows from front end 4 of vehicle 2 towards airbox 112. Lower housing portion 116 includes at least one, and illustratively three, inlets 126 which are configured to receive air flowing into vehicle 2 at front end 4. Inlets may have a tapered configuration when extending into interior volume 120 for decreasing noise from the air flowing therein. The air from front end 4 of vehicle 2 flows into inlets 126, for example from inlet area 129 (FIG. 4) adjacent lights for vehicle 2, and into interior volume 120. Once the air is within interior volume 120, the air flows upwardly through filter 122 and travels from airbox 112 into air conduit 128 which is coupled to upper housing portion 114. The filtered air within air conduit 128 then flows into engine 72 to facilitate combustion therein.

It may be appreciated that inlets 126 are positioned above cooling assembly 80 (FIG. 5) such that cooling assembly 80 does not inhibit air flow into inlets 126. More particularly, air intake assembly 74 is positioned above radiator 82, as shown in FIG. 5, and extends above second and third shrouds 92, 98 and fans 84. In this way, inlets 126 of air intake assembly 74 only receive air flowing at front end 4 of vehicle 2 (via inlet area 129) which is above cooling assembly 80 such that air intake assembly 74 and cooling assembly 80 are not scavenging air from each other. Furthermore, because cooling assembly 80 directs the warm exiting radiator 82 and fans 84 downwardly, the warm air expelled from cooling assembly 80 does not recirculate or otherwise flow into air intake assembly 74.

Figure 13:
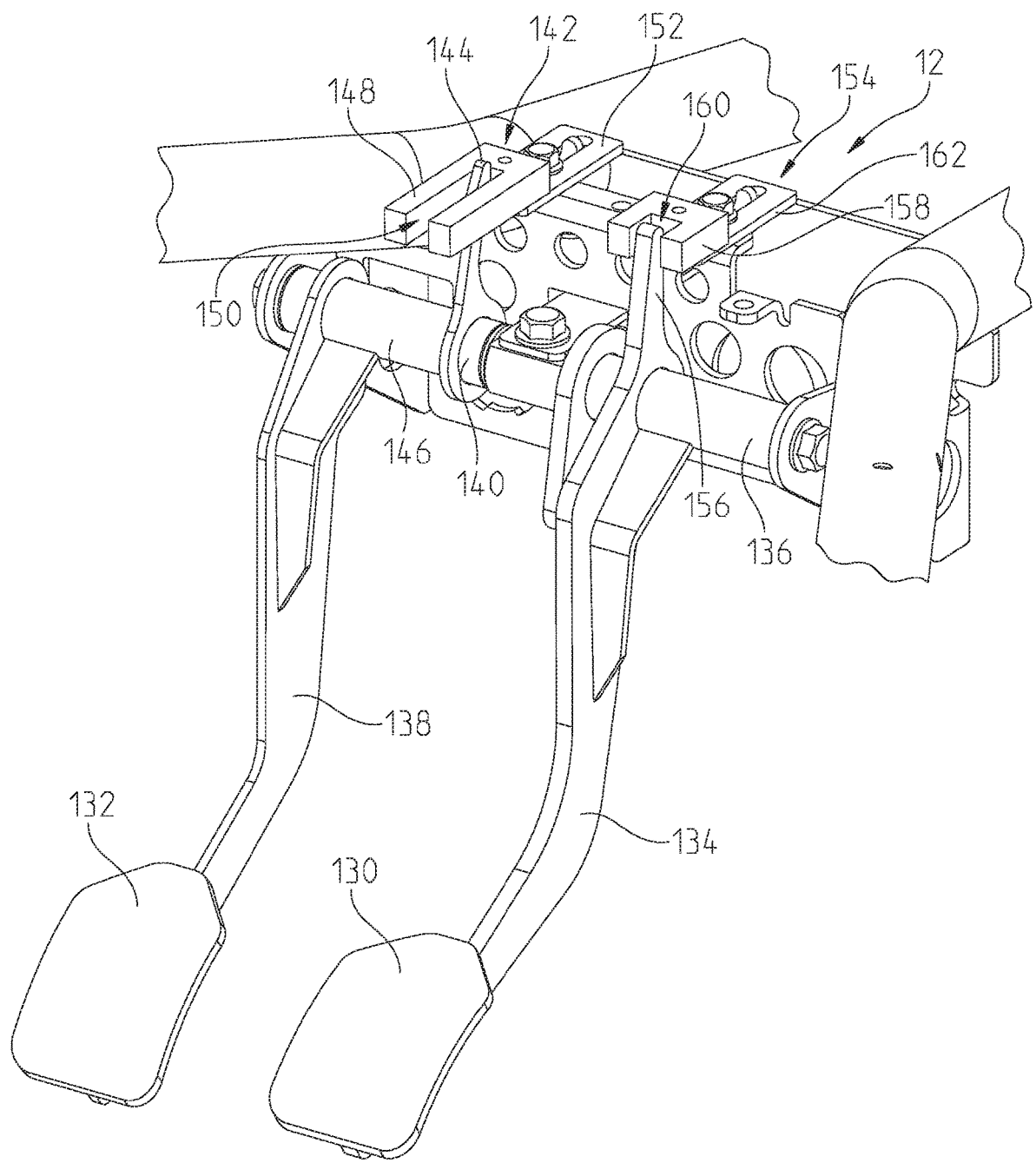
FIG. 13 is a rear right perspective view of operator inputs for the vehicle of FIG. 1, including a clutch pedal and a brake pedal.
Figure 14:
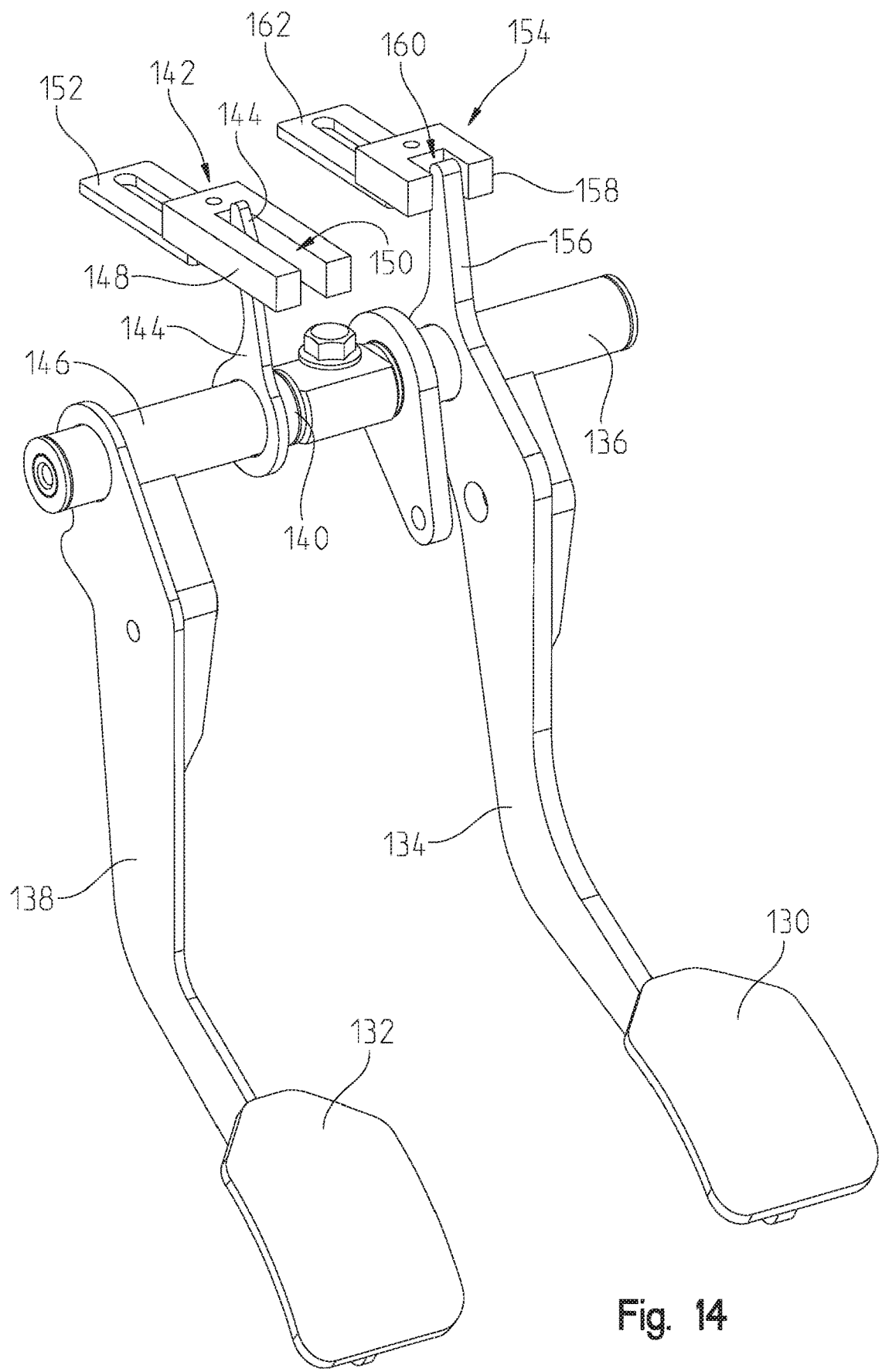
FIG. 14 is a rear left perspective view of the clutch pedal and brake pedal of FIG. 13 in a first position.
Figure 15:
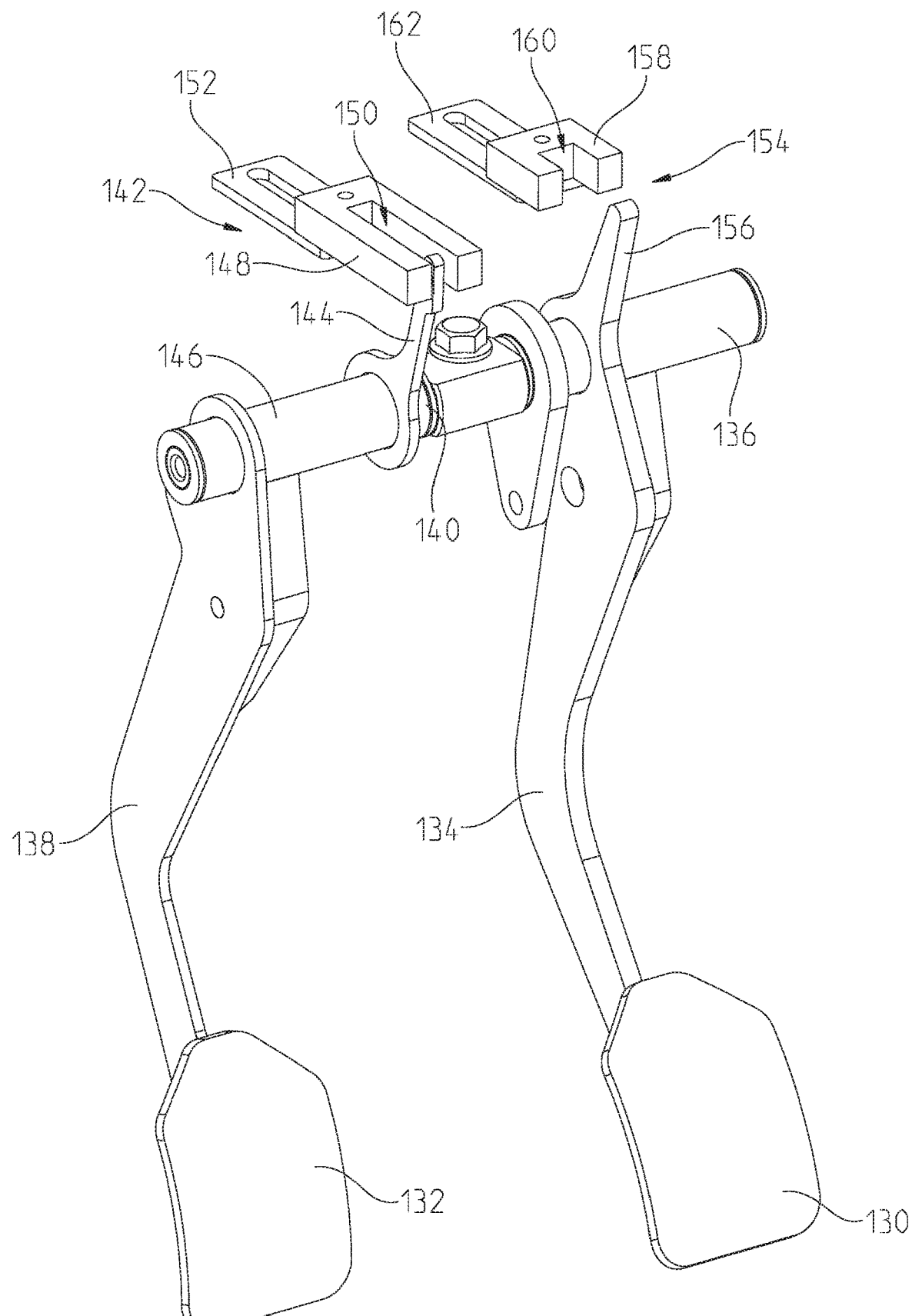
FIG. 15 is a rear left perspective view of the clutch pedal and brake pedal of FIG. 13 in a second position.

Referring now to FIGS. 13-15, various operator inputs are used in combination with powertrain assembly 70 for operating vehicle 2. For example, operator area 26 includes a throttle pedal (not shown), a brake pedal 130, and a clutch pedal 132. Brake pedal 130 is coupled to frame assembly 12 through a lever arm 134 which is configured to rotate about a frame member or bar 136. Similarly, clutch pedal 132 is coupled to frame assembly 12 through a lever arm 138 which is configured to rotate about a frame member or bar 140.

Both brake pedal 130 and clutch pedal 132 include non-contact switches operably coupled thereto. More particularly, clutch pedal 132 includes a switch assembly 142 which includes a switch lever 144 coupled to lever arm 138 through a sleeve 146. In this way, switch lever 144 is configured to move with clutch pedal 132 and lever arm 138 when the operator depresses and releases the clutch. Switch lever 144 is configured to move between a first or disengaged position (FIG. 14) in which switch lever 144 is positioned at a forward end of an opening 150 of a switch housing 148 when the operator does not depress clutch pedal 132 and a second or engaged position when the operator depresses clutch pedal 132 in which switch lever 144 is moved to a rearward end of opening 150 of switch housing 148 (FIG. 15). Switch housing 148 may be coupled to a tab 152 which is supported on frame assembly 12. In one embodiment, switch assembly 142 for clutch pedal 132 is a Hall-Effect switch. By configuring switch assembly 142 as a non-contact switch assembly, there is no need to determine necessary forces to overcome spring forces as would be the case for various embodiments of contact switches.

In operation, in order to start vehicle 2, the operator must depress clutch pedal 132 such that the bottom of travel for switch assembly 142 defines a starter interlock. In this way, clutch pedal 132 and switch assembly 142 ensure that vehicle 2 is not started when vehicle 2 is in gear. Additionally, depressing clutch pedal 132 may activate an engine or vehicle control module (not shown) for vehicle 2, which may allow various electrical components of vehicle 2 to be turned on or otherwise accessed without turning on engine 72. For example, depressing clutch pedal 132, thereby actuating the control module, may allow for access to display 42 (FIG. 2). Clutch pedal 132 also may include other switches for operating other vehicle systems, such as cruise control, for example.

Referring still to FIGS. 13-15, brake pedal 130 also includes a non-contact switch assembly 154 which includes a switch lever 156 coupled to lever arm 134 and, illustratively, is integrated with lever arm 134. In this way, switch lever 156 is configured to move with brake pedal 130 and lever arm 134 when the operator depresses and releases the brake. Switch lever 156 is configured to move between a first or disengaged position (FIG. 14) in which switch lever 156 is positioned at a forward end of an opening 160 of a switch housing 158 when the operator does not depress brake pedal 130 and a second or engaged position when the operator depresses brake pedal 130 in which switch lever 156 is moved outside of switch housing 158 (FIG. 15). Switch housing 158 may be coupled to a tab 162 which is supported on frame assembly 12.

Figure 16A:
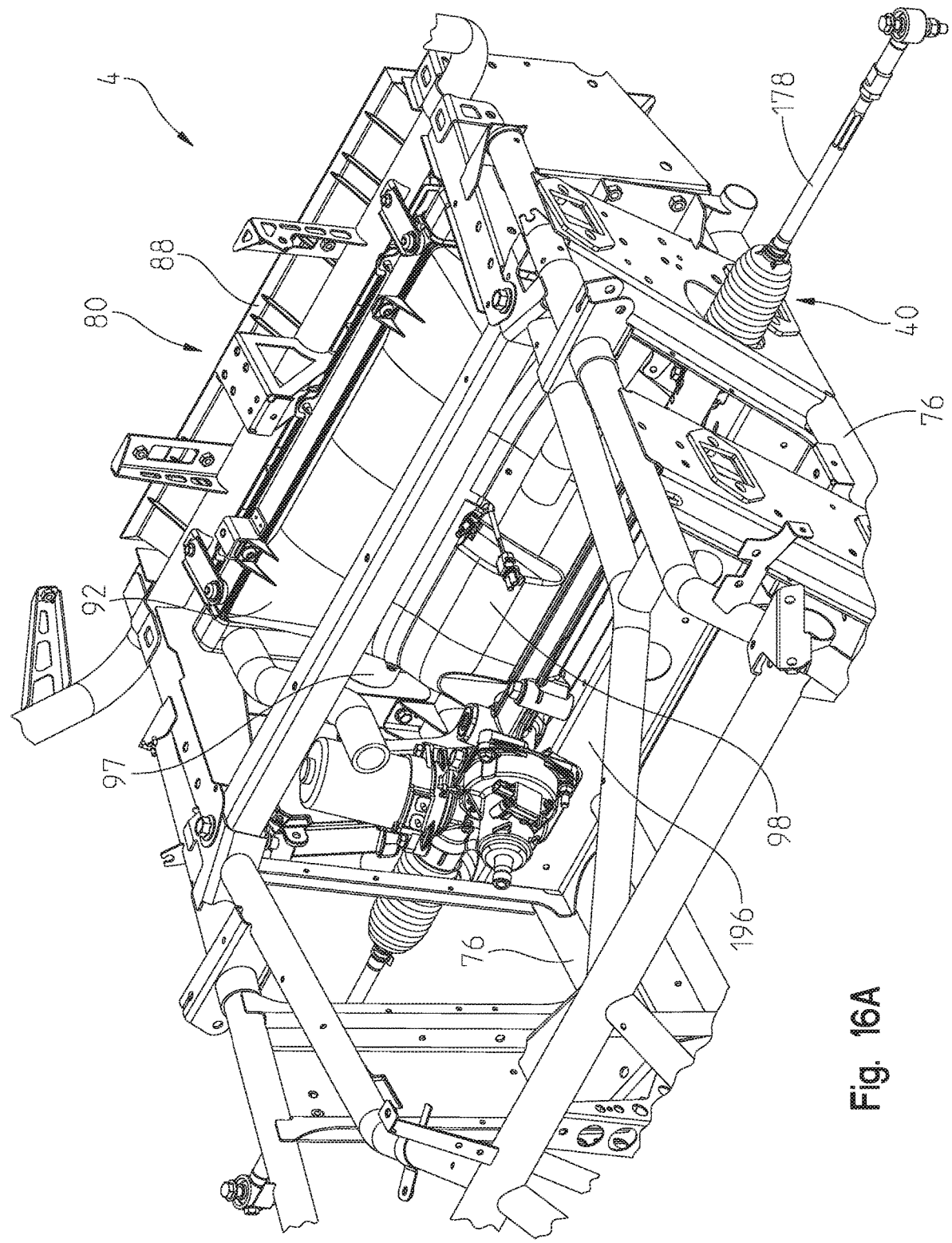
FIG. 16A is a rear right perspective view of the cooling assembly and a steering assembly supported on the frame assembly.
Figure 16B:
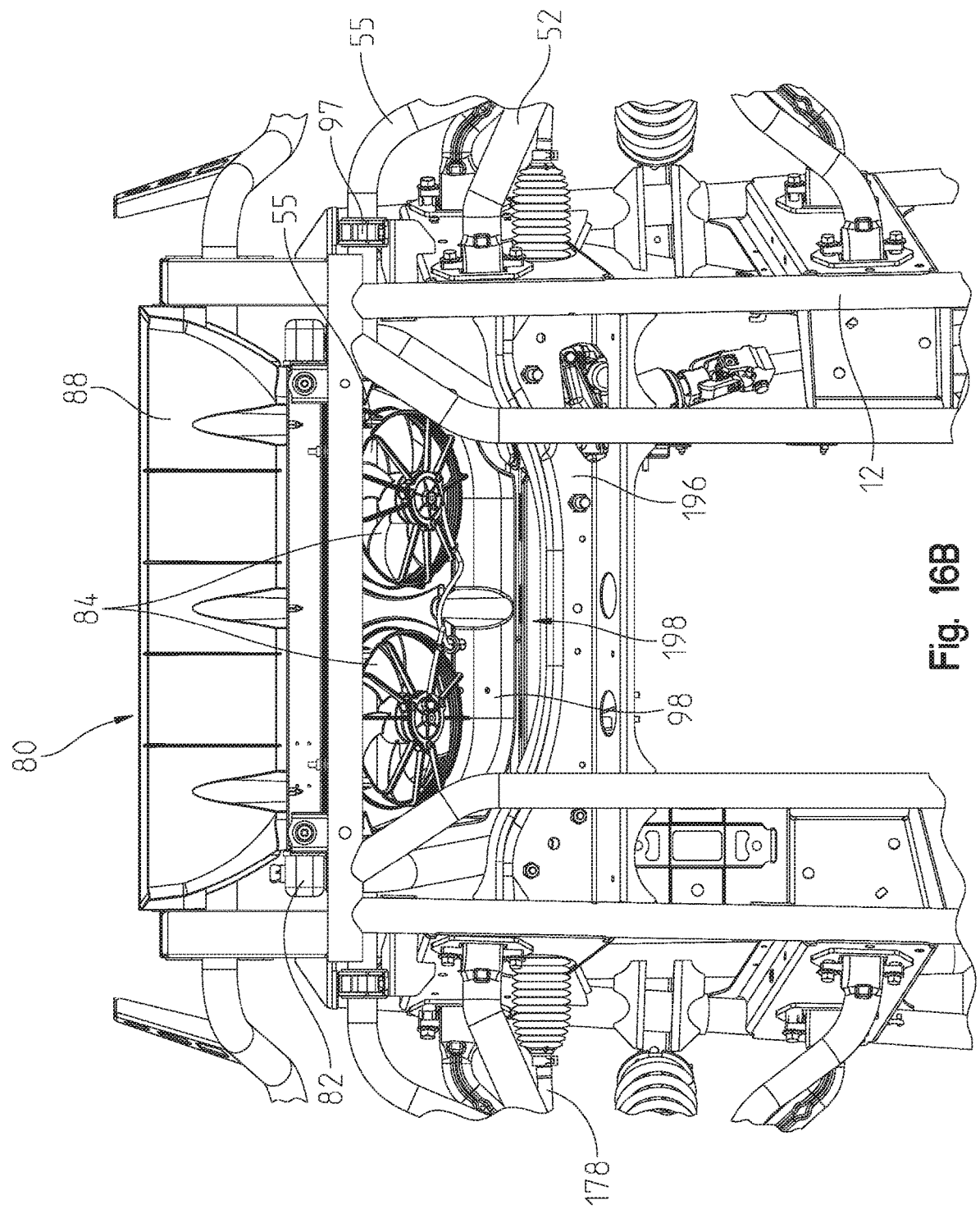
FIG. 16B is a bottom view of the steering assembly of FIG. 16A supported on the frame assembly rearward of the cooling assembly.
Figure 17:
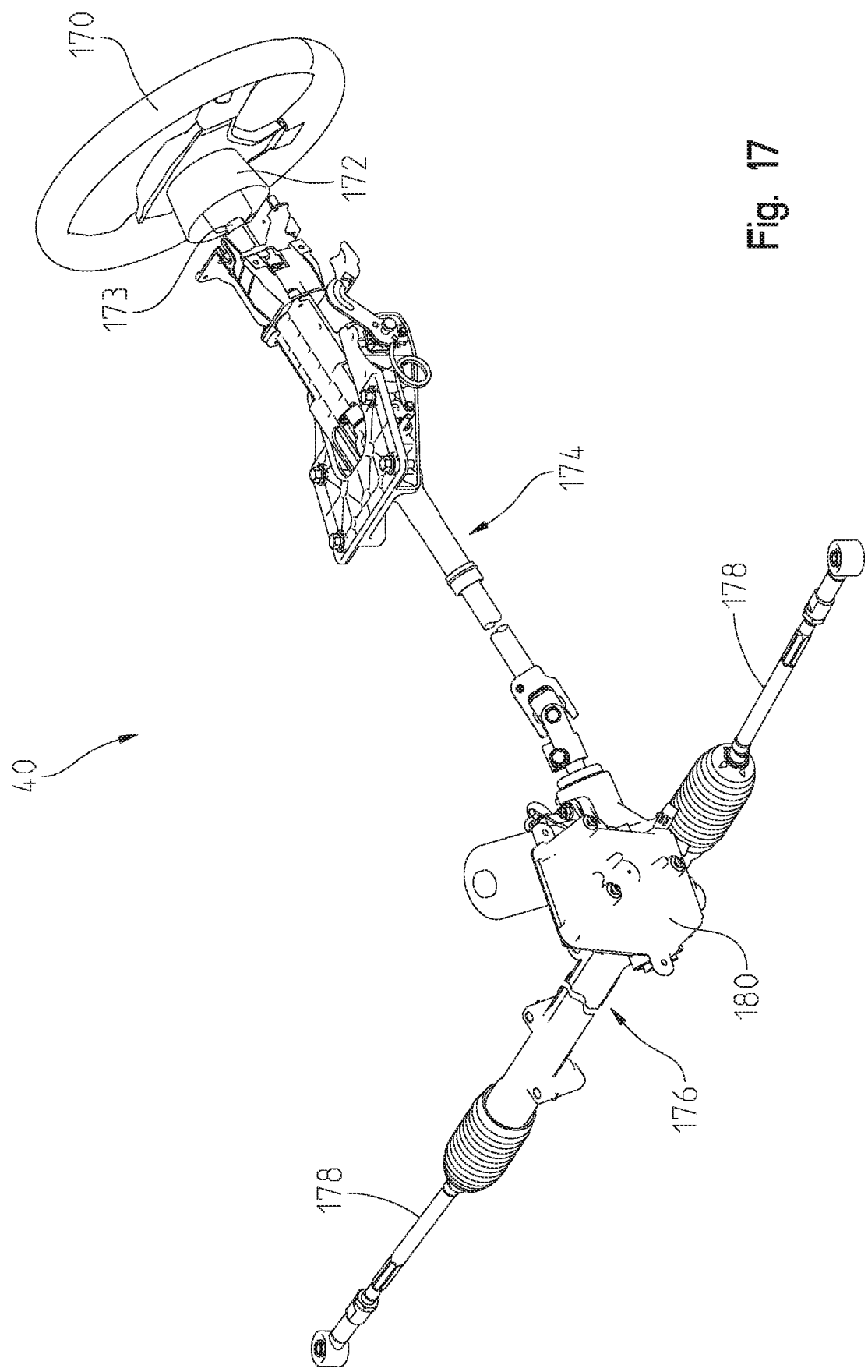
FIG. 17 is a front left perspective view of the steering assembly of FIG. 16A.
Figure 18A:
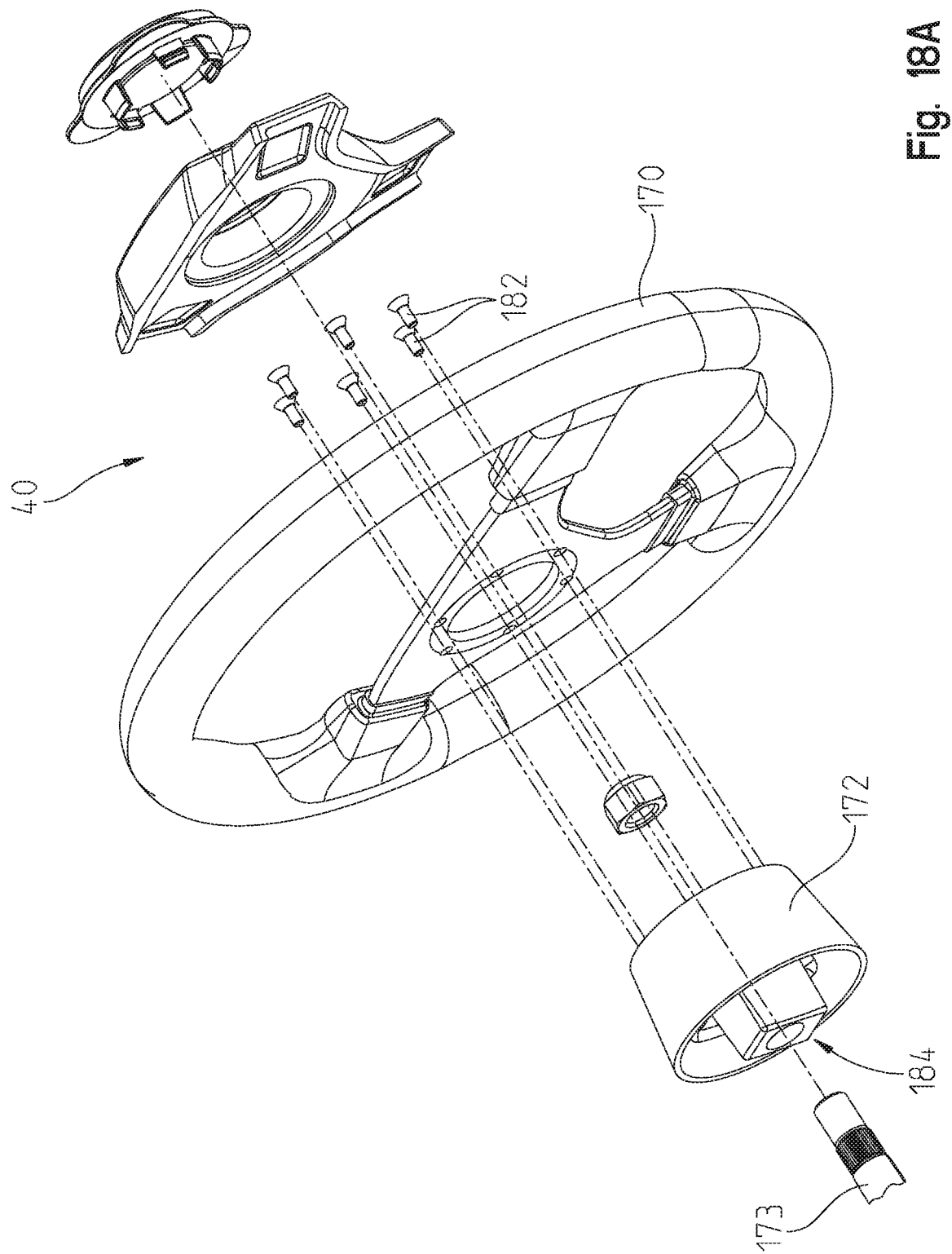
FIG. 18A is an exploded view of a portion of the steering assembly of FIG. 17.

Referring to FIGS. 16A-19, in addition to brake pedal 130 and clutch pedal 132, operator area 26 further includes additional operator inputs, such as steering assembly 40. Steering assembly 40 is supported on frame assembly 12 at front end 4 of vehicle 2 and, more particularly, as shown in FIGS. 16A and 16B, is supported on at least a frame member 196 at a position rearward of cooling assembly 80. More particularly, at least a portion of steering assembly 40 may be positioned longitudinally intermediate engine 72 (FIG. 5) and cooling assembly 80 such that steering assembly 40 does not interfere with either cooling assembly 80 or engine 72. Further, frame member 196 includes a recessed or scalloped portion 198 which also decreases the likelihood of interference between any of steering assembly 40, cooling assembly 80, and powertrain assembly 70. Additionally, as shown in FIGS. 16A and 16B, frame member 196 is positioned directly rearward of third shroud 98 of cooling assembly 80 such that the air flow from radiator 82 which is directed downwardly by third shroud 98 also is further impeded from flowing towards operator area 26 and engine 72 by frame member 196.

Steering assembly 40 includes a steering wheel 170, a steering wheel base 172 which operably couples steering wheel 170 to a steering column 173, a steering post or shaft 174, a steering gear 176, illustratively a rack and pinion assembly, tie rods 178, and an electric power steering ("EPS") module 180. In operation, as the operator rotates steering wheel 170, the rotation thereof is transmitted to steering column 173 and into steering shaft 174, and, using steering gear 176, the rotational motion through steering shaft 174 is translated into linear motion for movement of tie rods 178 which ultimately steer front wheels 8 (FIG. 1). In one embodiment, steering shaft 174 may be aluminum.

Figure 19:
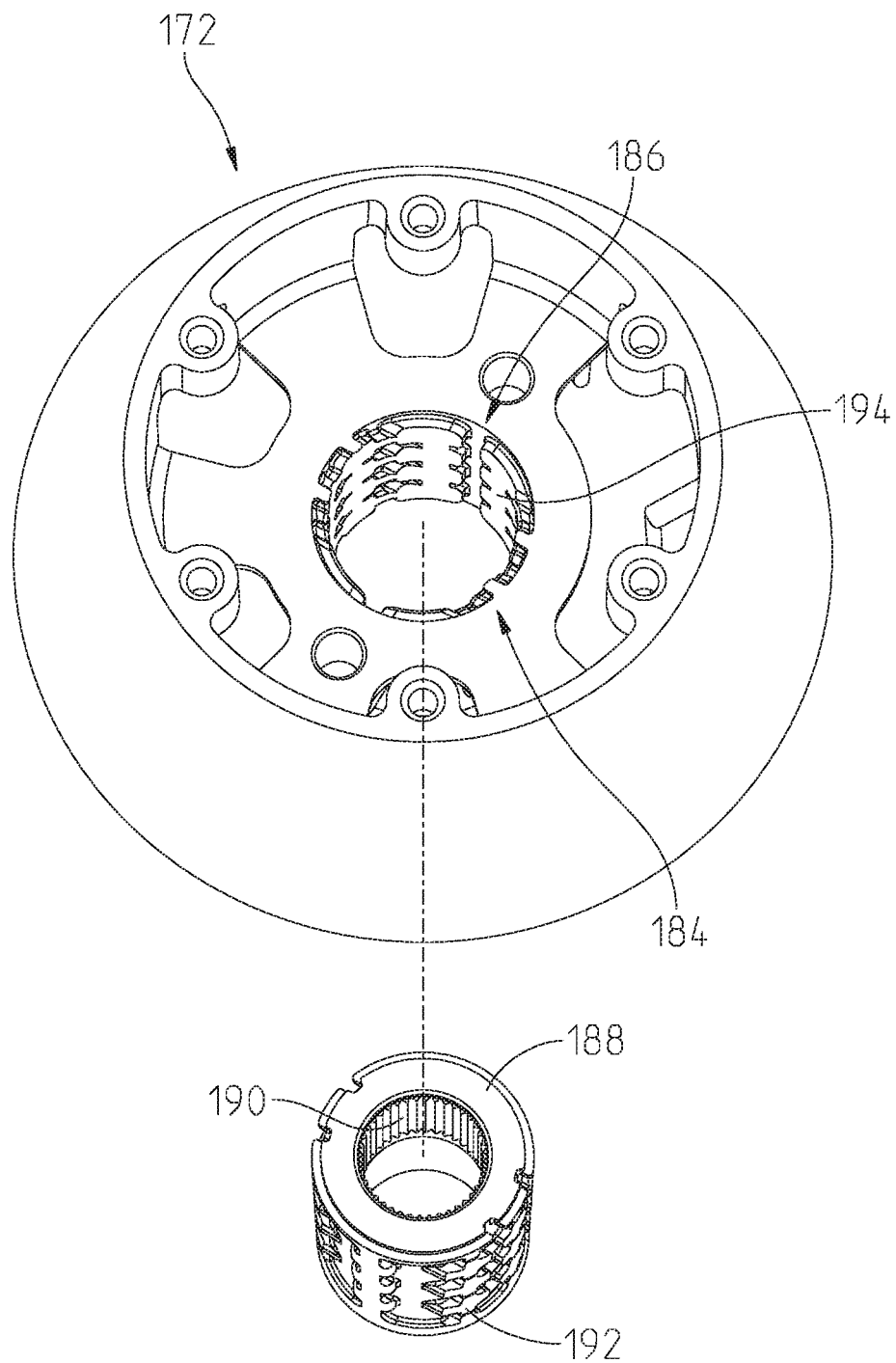
FIG. 19 is an exploded view of the steering wheel adapter of FIG. 18B.

Referring still to FIGS. 16A-19, steering wheel base 172 is configured to operably coupled steering wheel 170 to steering column 173. More particularly, steering wheel 170 is coupled to steering wheel base 172 with a plurality of removable fasteners 182, such as bolts. Additionally, steering wheel base 172 includes an adapter portion 184 configured to receive an upper end of steering column 173. Adapter portion 184 is illustratively a two-piece adapter defined by a protrusion 186 and a cylindrical member 188 configured to be received within protrusion 186. Cylindrical member 188 threadedly receives the upper end of steering column 173 through internal splines 190 (FIG. 19). The outer surface of cylindrical member 188 includes a plurality of protrusions and grooves or recesses 192 which are configured to cooperate with a plurality of protrusions and grooves or recesses 194 along the inner surface of protrusion 186 to retain cylindrical member 188 within protrusion 186.

In one embodiment, steering wheel base 172, including protrusion 186 of adapter portion 184, may be comprised of a light-weight metallic material, such as aluminum, thereby decreasing the overall weight of steering assembly 40. However, cylindrical member 188 of adapter portion 184 may be comprised of a heavier and/or higher-strength material, such as steel. In one embodiment, steering wheel base 172, including protrusion 186 of adapter portion 184, may be die cast over or atop cylindrical member 188.

Figure 20:
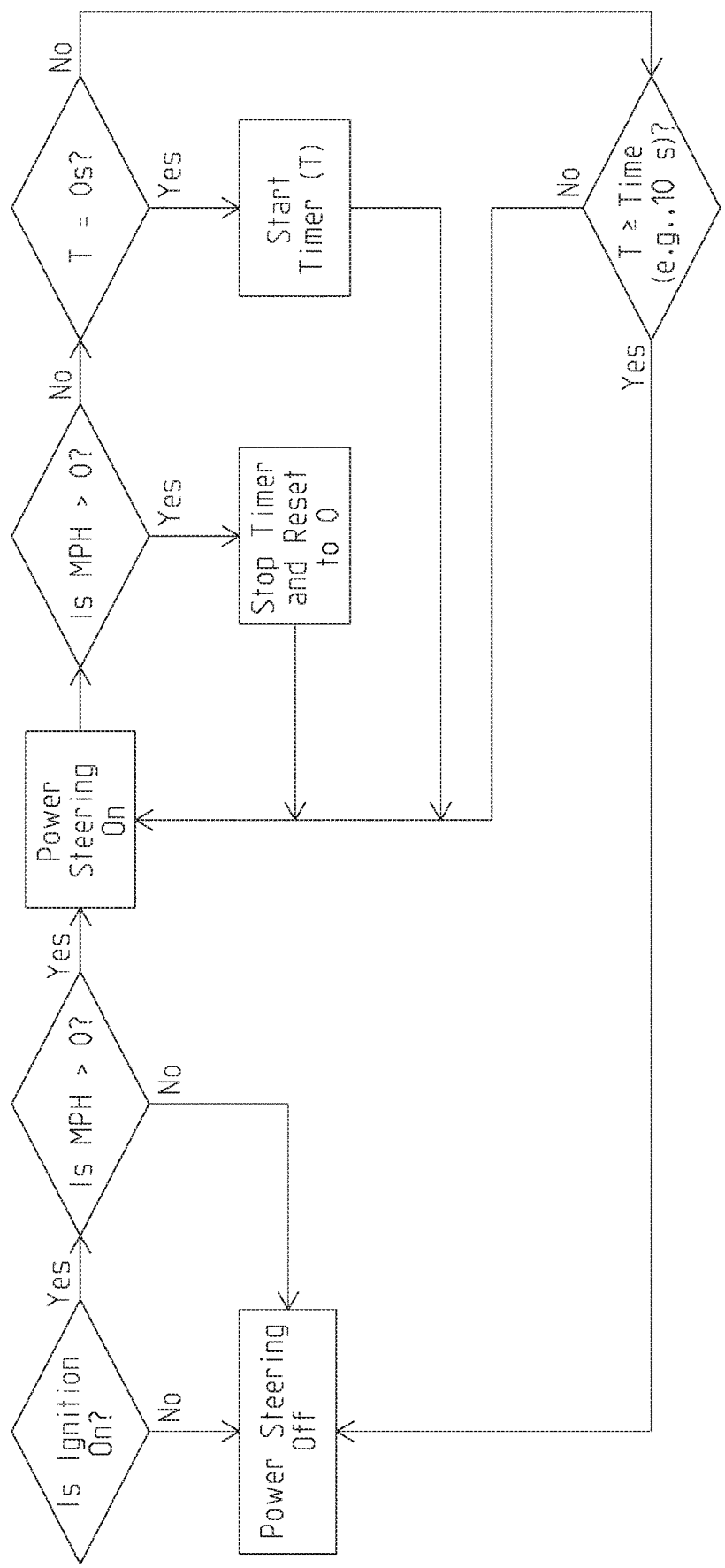
FIG. 20 is a logic flowchart disclosing the operation and operating conditions of an electric power steering module of the steering assembly of FIG. 17.

In operation, steering assembly 40 may be configured to steer vehicle 2 during operation thereof. Additionally, and as shown in FIG. 20, EPS module 180 is configured to be actuated when the ignition of vehicle 2 is turned on and a wheel speed is detected, for example with a wheel speed sensor (not shown). Therefore, EPS module 180 may be actuated merely through activating the ignition of vehicle 2 but not turning on engine 72. However, if engine 72 is not turned on within a predetermined period of time (e.g., 2-10 minutes and, illustratively approximately 5 minutes), an indicator (e.g., a warning lamp or light) may alert the operator that EPS module 180 will turn off, as shown in FIG. 20. As such, if engine 72 is started when the indicator is active, EPS module 180 will not be actuated and the operator will not have any power assist for steering assembly 40. Therefore, in order to use EPS module 180 after an extended period without turning on engine 72, the ignition must first be cycled off and then turned back on for vehicle 2 to utilize EPS module 180. In this way, vehicle 2 allows for vehicle 2 to be easily pushed or moved when engine 72 is not operating, for example in a garage, shop, or on trails or various terrain, if necessary, by activating the ignition without engine 72 running.

Additionally, and referring still to FIG. 20, if no wheel speed is detected, EPS module 180 may not be actuated.

Further, if EPS module 180 is actuated upon initial detection of a wheel speed, EPS module 180 is configured to power off if wheel speed is not continuously detected for a predetermined period of time. For example, if wheel speed is not detected for up to one minute, EPS module 180 may turn off. More particularly, if wheel speed is not detected for 30 seconds, EPS module 180 may turn off. In the illustrative embodiment, EPS module 180 may be turned off when no wheel speed is detected after approximately 10-20 seconds, and more particularly 10-15 seconds.

As such, as shown in Table 1, EPS module 180 operates according to at least Conditions 1, 2, 3, and 4 shown therein. When transitioning to Condition 2 from Condition 3, there may be a delay in turning off EPS module 180, for example an approximately 10- to 15-second delay, as shown in FIG. 20. Therefore, if vehicle speed (i.e., wheel speed) resumes to a speed greater than zero within that delay period, the condition resets to Condition 3 such that EPS module 180 remains on and continues to assist steering assembly 40.

TABLE 1

| Condition # | Ignition State | Vehicle/Wheel Speed | Engine Crank Speed | EPS Assist State |
|---|---|---|---|---|
| 1 | Off | 0 | 0 | Off |
| 2 | On | 0 | 0 | Off |
| 3 | On | >0 | 0 | On |
| 4 | On | >0 | >0 | On |

Additional details of vehicle 2 may be disclosed in U.S. patent application Ser. No. 15/043,335, filed Feb. 12, 2016, titled "THREE WHEELED VEHICLE," the complete disclosure of which is expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A vehicle, comprising:
a plurality of ground-engaging members;
a frame assembly supported by the ground-engaging members;
a powertrain assembly supported by the frame and including at least an engine; and
a cooling assembly fluidly coupled to at least the engine and including a radiator and at least one fan positioned rearward of the radiator and angled relative to the radiator, wherein a top of the at least one fan is a first distance from the radiator and a bottom of the at least one fan is a second distance from the radiator, the first distance being greater than the second distance.

2. The vehicle of claim 1, wherein the radiator extends in a vertical plane and the at least one fan extends in a plane angled relative to the vertical plane.

3. The vehicle of claim 1, wherein the cooling assembly further comprises a first shroud extending forward of the radiator and the at least one fan and a second shroud extending rearward of the radiator and forward of the at least one fan, and the second shroud has a curved shape extending between the radiator and the at least one fan.

4. The vehicle of claim 1, wherein the plurality of ground-engaging members includes two front ground-engaging members and a single rear ground-engaging member.

5. The vehicle of claim 1, further comprising a front suspension assembly having at least a control arm and a shock absorber, and the control arm and the shock absorber are operably coupled to the frame assembly, and the cooling assembly is positioned below an upper portion of the shock absorber.

6. The vehicle of claim 1, wherein the at least one fan is angled approximately 30-60 degrees relative to the radiator.

7. The vehicle of claim 6, wherein the at least one fan is angled approximately 36-40 degrees relative to the radiator.

8. A vehicle, comprising:
a plurality of ground-engaging members configured to contact a ground surface, including at least one front ground-engaging member having an axis of rotation;
a braking assembly operably coupled to the at least one front ground-engaging member, the braking assembly including a brake disc;
a frame supported by the ground-engaging members, the frame including a front frame portion and a rear frame portion;
a body assembly comprising a plurality of body panels supported by the frame;
a powertrain assembly operably coupled to the ground-engaging members; and
a cooling assembly fluidly coupled to the powertrain assembly, the cooling assembly including at least one radiator, the at least one radiator being positioned directly forward of the axis of rotation of the at least one front ground-engaging member, completely forward of a forwardmost extent of the brake disc, and below an upper surface of the at least one front ground-engaging member.

9. The vehicle of claim 8, wherein the frame includes a lower frame member extending longitudinally between the front and rear frame portions and defining a lower extent of the frame, and a lower end of the cooling assembly is positioned at approximately the same height relative to the ground surface as the lower frame member.

10. The vehicle of claim 8, wherein the cooling assembly includes a radiator and a center point of the radiator is positioned at approximately the same height relative to the ground surface as the axis of rotation of the at least one front ground-engaging member.

11. The vehicle of claim 10, wherein cooling assembly further includes at least one fan positioned rearward of the radiator, and at least a portion of the fan is positioned below the axis of rotation.

12. The vehicle of claim 11, wherein the at least one fan includes an upper end portion, a lower end portion, and an intermediate portion extending therebetween, and at least the intermediate and lower end portions are positioned below the axis of rotation.

13. The vehicle of claim 12, wherein at least the intermediate and lower end portions of the at least one fan are positioned below the center point of the radiator.

14. The vehicle of claim 8, wherein the cooling assembly includes a radiator and at least one fan, and the at least one fan is angled relative to the radiator.

15. The vehicle of claim 8, wherein the at least one ground engaging member includes a hub and a tire, the at least one radiator being positioned completely forward of a forwardmost extent of the hub.

16. The vehicle of claim 15, wherein the at least one radiator is positioned completely forward of a forwardmost extent of the tire.

17. A vehicle, comprising:
a plurality of ground-engaging members;
a frame assembly supported by the ground-engaging members;
a powertrain assembly supported by the frame and including at least an engine; and
a cooling assembly fluidly coupled to at least the engine and including a radiator, at least one fan positioned rearward of the radiator, and a shroud extending rearward of the radiator and forward of the at least one fan, and a forward end of the shroud extends vertically and a rearward end of the shroud is angled relative to vertical such that the shroud is configured to direct air flowing through the radiator downwardly.

18. The vehicle of claim 17, wherein the cooling assembly further includes a second shroud extending forward of the radiator and a third shroud positioned rearward of the radiator and the at least one fan.

19. The vehicle of claim 17, wherein the at least one fan is angled relative to the radiator.

20. The vehicle of claim 17, further comprising a body assembly comprising a plurality of body panels and a grille configured to allow air to flow through the cooling assembly, and the at least one fan is positioned at least partially below the grille.

21. The vehicle of claim 20, wherein a lower extent of the cooling assembly is generally vertically aligned with a lower extent of the body assembly at a front end portion of the frame.

22. The vehicle of claim 17, further comprising a front suspension assembly having at least a control arm and a shock absorber, and the control arm and the shock absorber are operably coupled to the frame assembly, and the cooling assembly is positioned below an upper portion of the shock absorber.

23. The vehicle of claim 22, wherein the shroud is configured to receive a portion of the front suspension assembly.

24. The vehicle of claim 23, wherein the portion of the front suspension assembly includes a stability bar extending laterally outward from the shroud.

25. The vehicle of claim 23, wherein the shroud includes a sealed retention member configured to receive the portion of the front suspension assembly at a position rearward of the radiator.

* * * * *